United States Patent
Zheng et al.

(10) Patent No.: US 12,549,982 B2
(45) Date of Patent: Feb. 10, 2026

(54) CELL MEASUREMENT METHOD AND COMMUNICATIONS APPARATUS

(71) Applicant: Huawei Technologies Co., Ltd., Shenzhen (CN)

(72) Inventors: Lili Zheng, Shanghai (CN); Tingting Geng, Shanghai (CN); Yedan Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 360 days.

(21) Appl. No.: 17/707,566

(22) Filed: Mar. 29, 2022

(65) Prior Publication Data
US 2022/0225150 A1    Jul. 14, 2022

Related U.S. Application Data

(63) Continuation of application No. PCT/CN2019/109444, filed on Sep. 30, 2019.

(51) Int. Cl.
*H04W 24/08* (2009.01)
*H04W 24/10* (2009.01)

(52) U.S. Cl.
CPC ........... *H04W 24/10* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 2013/0344814 A1* | 12/2013 | Fujishiro | H04B 17/318 455/67.11 |
| 2014/0016492 A1 | 1/2014 | Jung et al. | |
| 2014/0269356 A1* | 9/2014 | Lai | H04W 36/0088 370/252 |
| 2016/0112908 A1 | 4/2016 | Chin et al. | |
| 2020/0359247 A1* | 11/2020 | Yi | H04W 24/10 |

(Continued)

FOREIGN PATENT DOCUMENTS

| | | |
|---|---|---|
| CN | 101998439 A | 3/2011 |
| CN | 108882293 A | 11/2018 |

(Continued)

OTHER PUBLICATIONS

Huawei et al, "Considerations on cell reselection in NTN", 3GPP TSG-RAN WG2 Meeting #107 R2-1910578, Aug. 26-30, 2019, 4 pages, Prague, Czech Republic.
Spreadtrum Communications, "Impacts caused by measurement variations in NTN", 3GPP TSG-RAN WG2 Meeting #107 R2-1909094, Aug. 26-30, 2019, 3 pages, Prague, Czech Republic.
ZTE, "Further Discussion on UE Mobility Scenarios in NTN", 3GPP TSG RAN WG3#102 R3-186329, Nov. 12-16, 2018, 5 pages, Spokane, USA.
3GPP TR 38.821 V0.5.0, 3rd Generation Partnership Project; Technical Specification Group Radio Access Network; Solutions for NR to support non-terrestrial networks (NTN) (Release 16), Apr. 2019, 58 pages.

(Continued)

*Primary Examiner* — Scott M Sciacca
(74) *Attorney, Agent, or Firm* — Slater Matsil, LLP

(57) ABSTRACT

This application provides a cell measurement method and a communications apparatus. The method may include: A terminal device measures a serving cell, where the serving cell is a satellite cell. The terminal device determines whether the serving cell meets a preset condition. For example, compared with a last measurement result, whether quality of the serving cell becomes better or remains unchanged, or deteriorates but a deterioration magnitude is relatively small. When the serving cell meets the preset condition, the terminal device does not measure or stops measuring the serving cell within a first duration. The terminal device may measure the serving cell after the first duration expires.

18 Claims, 10 Drawing Sheets

(56) References Cited

U.S. PATENT DOCUMENTS

2022/0086671 A1\*  3/2022  Hong ............... H04W 16/28
2022/0116837 A1\*  4/2022  Lee ................ H04W 36/0094

FOREIGN PATENT DOCUMENTS

| CN | 109089292 A | 12/2018 |
| CN | 109151922 A | 1/2019 |
| EP | 2663119 A2 | 11/2013 |
| WO | 2016061081 A1 | 4/2016 |

OTHER PUBLICATIONS

"Service Continuity Between Non-Terrestrial and Terrestrial Networks," Agenda Item: 111.6.4.3, Source: Huawei, HiSilicon, Document for: Discussion and Decision, 3GPP TSG-RAN WG2 Meeting 107, R2-1910577 revision of R2-1907792, Prague, Czech Republic, Aug. 26-30, 2019, 4 pages.

"Idle State Mobility Scenarios for Non-Terrestrial Networks," Agenda Item: 20.1, Source: TNO, Thales, Document for: Discussion, 3GPP TSG-RAN WG3 #101-Bis, R3-185957, Chengdu, China, Oct. 8-12, 2018, 5 pages.

\* cited by examiner

CELL MEASUREMENT METHOD AND COMMUNICATIONS APPARATUS

CROSS-REFERENCE TO RELATED APPLICATIONS

This application is a continuation of International Application No. PCT/CN2019/109444, filed on Sep. 30, 2019, the disclosure of which is hereby incorporated by reference in its entirety.

TECHNICAL FIELD

This application relates to the communications field, and specifically, to a cell measurement method and a communications apparatus.

BACKGROUND

A terrestrial communications system cannot implement true "seamless coverage". For example, in a rural area with a low population density, there are usually not enough cellular networks. For another example, in a maritime or aviation area, it is even more impossible to implement communication through a terrestrial network.

Because of "ubiquitous" and "direct user-oriented" features of satellite communication, satellite communication technologies develop rapidly in the fields of satellite TV direct broadcast services, mobile satellite services, Internet access, private networks, military communication, and the like. Therefore, in a discussion about a $5^{th}$ generation (5G) system in the $3^{rd}$ generation partnership project (3GPP) protocol, a satellite is to be used as a new access manner.

In this case, in the satellite communication, how to measure a cell becomes an urgent problem to be solved.

SUMMARY

This application provides a cell measurement method and a communications apparatus, to reduce an unnecessary measurement and help a terminal device save power.

According to a first aspect, a cell measurement method is provided. The method may be performed by a terminal device, or may be performed by a chip or a circuit configured in a terminal device. This is not limited in this application.

The method may include: measuring a serving cell in a first time period, where the serving cell is a satellite cell; and skipping measuring the serving cell within a first duration when the serving cell meets a preset condition.

The first time period may indicate time at which the terminal device measures the serving cell, or specific time at which the terminal device measures the serving cell, or specific time at which the terminal device performs cell measurement.

Optionally, the first time period may be a time period in which a current moment is located. In other words, the terminal device measures the serving cell at the current moment. For example, the terminal device starts to measure the serving cell at the current moment, or the terminal device is measuring the serving cell at the current moment, or the terminal device stops measuring the serving cell at the current moment.

Optionally, the terminal device may be in an idle state or an inactive state.

The serving cell being a satellite cell indicates that the serving cell is a cell deployed in a satellite network or a cell located in a satellite communications system. For example, the satellite communications system may include a geostationary earth orbit (GEO) satellite, or may include a low earth orbit (LEO) satellite and a medium earth orbit (MEO) satellite, or may include a multi-satellite network formed by a GEO satellite and a MEO satellite. This is not limited.

Optionally, whether the serving cell meets the preset condition may be determined based on a result of measuring the serving cell by the terminal device in the first time period, or based on a measurement result of the serving cell this time.

Optionally, the terminal device may receive information about the first duration.

The terminal device does not measure the serving cell within the first duration. In other words, the terminal device stops measuring the serving cell within the first duration. In other words, the terminal device does not perform measurements on the serving cell within the first duration. In other words, the terminal device cannot measure the serving cell within the first duration. Alternatively, it may be understood that the terminal device may measure the serving cell after the first duration expires (or ends).

It should be understood that, that the terminal device may measure the serving cell when the first duration expires does not mean that the terminal device definitely measures the serving cell when the first duration expires. When the first duration expires, the terminal device may further consider another factor to determine whether to measure the serving cell, for example, whether quality of the current serving cell triggers a cell reselection procedure. This is not limited in this embodiment of this application.

Based on the foregoing technical solution, when the serving cell meets a specific condition (for example, the preset condition), or when the quality of the serving cell meets the preset condition, the serving cell is not measured within a period of time (for example, the first duration), to reduce unnecessary cell measurement, and help the terminal device save power.

With reference to the first aspect, in some implementations of the first aspect, that the serving cell meets a preset condition includes any one of the following: quality of the serving cell in the first time period is greater than or equal to a first threshold, or quality of the serving cell in the first time period is greater than or equal to quality of the serving cell in a second time period, or a difference between quality of the serving cell in a second time period and quality of the serving cell in the first time period is less than a second threshold, or the serving cell meets a cell selection criterion. The second time period is before the first time period, and the second threshold is greater than or equal to 0.

Optionally, the quality of the serving cell in the first time period may indicate quality of the serving cell measured this time.

Optionally, the quality of the serving cell in the first time period being greater than or equal to the quality of the serving cell in the second time period may indicate that the quality of the serving cell becomes better or remains unchanged compared with that measured last time (namely, a last measurement result).

Optionally, the difference between the quality of the serving cell in the second time period and the quality of the serving cell in the first time period being less than the second threshold may indicate that the quality of the serving cell in the first time period deteriorates compared with the quality of the serving cell in the second time period, but a deterioration magnitude is very small, for example, less than or equal to the second threshold.

Based on the foregoing technical solution, when the quality of the serving cell becomes better or is the same compared with that measured last time (namely, a last measurement result), or the quality of the serving cell deteriorates compared with that measured last time, but the deterioration magnitude is very small, the terminal device does not measure the serving cell within the first duration. This can reduce an unnecessary measurement and help the terminal device save power.

With reference to the first aspect, in some implementations of the first aspect, the method further includes: when the serving cell meets the preset condition, starting a timer by using the first duration as a duration. The skipping measuring the serving cell within a first duration includes: skipping measuring the serving cell during running of the timer.

During running of the timer, the terminal device does not measure the serving cell. When the timer expires (or times out), the terminal device may measure the serving cell.

Based on the foregoing technical solution, when the serving cell meets the preset condition, the timer is started by using the first duration as the duration, and the serving cell is not measured during running of the timer. This can reduce the unnecessary measurement and help the terminal device save power.

With reference to the first aspect, in some implementations of the first aspect, the first duration is determined based on a duration adjustment parameter, and the duration adjustment parameter is greater than 0.

Optionally, the first duration and the duration adjustment parameter may be included in a piece of signaling, for example, radio resource control (RRC) signaling or a broadcast message.

Optionally, the first duration may be determined based on a duration configured by a network device and the duration adjustment parameter. For example, the terminal device may determine a plurality of first durations with different lengths based on the duration configured by the network device and the duration adjustment parameter.

Optionally, the first duration may be a product of a duration configured by a network device and the duration adjustment parameter. Alternatively, the first duration may be a sum of a duration configured by a network device and one or more duration adjustment parameters. Details are described in the following embodiments.

Based on the foregoing technical solution, the first duration may be different. To be specific, after each measurement, the terminal device determines whether to skip measuring the serving cell within a first duration, and the first duration determined by the terminal device each time may be different. In this way, a length of a used first duration may be flexibly determined based on an actual communication situation. For example, when the quality of the serving cell is much greater than the quality measured last time, the terminal device may use a relatively long first duration. For another example, when the quality of the serving cell is less than the quality measured last time, the terminal device may use a relatively short first duration.

With reference to the first aspect, in some implementations of the first aspect, the method further includes: receiving indication information, where the indication information is used to indicate at least one of the following: information about the first duration, information about the first threshold, and information about the second threshold.

Optionally, the indication information may further include the duration adjustment parameter and/or a threshold adjustment parameter. One or more first durations may be determined by using the duration adjustment parameter. One or more second thresholds may be determined by using the threshold adjustment parameter. The duration adjustment parameter and the threshold adjustment parameter are described in detail in the following embodiments.

Optionally, the indication information may be carried in RRC signaling or a broadcast message. For example, the first duration, the first threshold, and the second threshold may be included in a piece of signaling, for example, RRC signaling or a broadcast message.

According to a second aspect, a cell measurement method is provided. The method may be performed by a network device, or may be performed by a chip or a circuit configured in a network device. This is not limited in this application.

The method may include: generating indication information, and sending the indication information. The indication information is used to indicate at least one of the following: information about a first duration, information about a first threshold, and information about a second threshold. The first duration is a duration within which a serving cell is not measured. The first threshold or the second threshold is used to determine whether the serving cell meets a first preset condition, and the second threshold is greater than or equal to 0. The serving cell is a satellite cell.

Optionally, the indication information may be carried in RRC signaling or a broadcast message. For example, the first duration, the first threshold, and the second threshold may be included in a piece of signaling, for example, RRC signaling or a broadcast message.

The serving cell being a satellite cell indicates that the serving cell is a cell deployed in a satellite network or a cell located in a satellite communications system. For example, the satellite may include a GEO satellite, or may include a LEO satellite and a MEO satellite, or may include a multi-satellite network formed by a GEO satellite and a MEO satellite. This is not limited.

The first duration is the duration within which the serving cell is not measured. In other words, a terminal device does not measure the serving cell within the first duration. In other words, the terminal device does not perform measurements on the serving cell within the first duration. In other words, the terminal device cannot measure the serving cell within the first duration. Alternatively, it may be understood that the terminal device may measure the serving cell after the first duration expires (or ends).

It should be understood that, that the terminal device may measure the serving cell when the first duration expires does not mean that the terminal device definitely measures the serving cell when the first duration expires. When the first duration expires, the terminal device may further consider another factor to determine whether to measure the serving cell, for example, whether quality of the current serving cell triggers a cell reselection procedure. This is not limited in this embodiment of this application.

Based on the foregoing technical solution, the network device may indicate information about a period of time (for example, the first duration) to the terminal device. In the period of time, the terminal device does not measure the serving cell. This can reduce unnecessary cell measurement and help the terminal device save power.

With reference to the second aspect, in some implementations of the second aspect, that the serving cell meets a first preset condition includes any one of the following: quality of the serving cell in a first time period is greater than or equal to the first threshold, or quality of the serving cell in a first time period is greater than or equal to quality of the serving cell in a second time period, or a difference between quality of the serving cell in a second time period and quality of the serving cell in a first time period is less than the second threshold, or the serving cell meets a cell selection criterion. The second time period is before the first time period, and the second threshold is greater than or equal to 0.

With reference to the second aspect, in some implementations of the second aspect, the method further includes: sending a duration adjustment parameter and/or a threshold adjustment parameter. The duration adjustment parameter is used to determine the first duration, the threshold adjustment parameter is used to determine the second threshold, and the duration adjustment parameter is greater than 0.

One or more first durations may be determined by using the duration adjustment parameter. One or more second thresholds may be determined by using the threshold adjustment parameter. The duration adjustment parameter and the threshold adjustment parameter are described in detail in the following embodiments.

According to a third aspect, a cell measurement method is provided. The method may be performed by a terminal device, or may be performed by a chip or a circuit configured in a terminal device. This is not limited in this application.

The method may include: The terminal device receives transmission quality configuration information; and the terminal device determines, based on the transmission quality configuration information and a transmission status of data, whether to measure a serving cell and/or a neighboring cell, where both the serving cell and the neighboring cell are satellite cells.

Optionally, the terminal device may be in a connected state.

Optionally, that the terminal device determines whether to measure a serving cell includes: The terminal device determines whether to start periodic measurement on the serving cell.

Optionally, that the terminal device determines whether to measure a neighboring cell includes: The terminal device determines whether to start measurement on the neighboring cell.

The serving cell and the neighboring cell being satellite cells indicates that the serving cell and the neighboring cell are cells deployed in a satellite network or a cell located in a satellite communications system. For example, the satellite may include a GEO satellite, or may include a LEO satellite and a MEO satellite, or may include a multi-satellite network formed by a GEO satellite and a MEO satellite. This is not limited.

Based on the foregoing technical solution, whether to measure the serving cell and/or the neighboring cell may be determined based on transmission quality. For example, measurement on the serving cell and/or the neighboring cell may not be started when the transmission quality is relatively good. Alternatively, measurement on the serving cell and/or the neighboring cell may be started when the transmission quality is relatively poor. This can reduce measurement on the serving cell and/or the neighboring cell, and help the terminal device save power.

With reference to the third aspect, in some implementations of the third aspect, the transmission quality configuration information includes a quantity N1 of retransmissions of the data, and N1 is an integer greater than 0. That the terminal device determines, based on the transmission quality configuration information and a transmission status of data, whether to measure a serving cell and/or a neighboring cell includes: The terminal device measures the serving cell and/or the neighboring cell when the terminal device fails to receive the data after N1 retransmissions.

Optionally, when the terminal device fails to receive (or fails to demodulate) the data after N1 retransmissions, the terminal device starts measurement on the serving cell.

Optionally, when the terminal device fails to receive (or fails to demodulate) the data after N1 retransmissions, the terminal device starts measurement on the neighboring cell.

Based on the foregoing technical solution, whether to start measurement on the serving cell and/or the neighboring cell may be determined based on the quantity of retransmissions and the transmission status of the data. In other words, measurement on the serving cell and/or the neighboring cell is started when the transmission quality of the serving cell is relatively poor, to reduce measurement on the serving cell and/or the neighboring cell, and help the terminal device save power.

With reference to the third aspect, in some implementations of the third aspect, the transmission quality configuration information includes a quantity N2 and a quantity N3 of retransmissions of the data, and both N2 and N3 are integers greater than 0. That the terminal device determines, based on the transmission quality configuration information and a transmission status of data, whether to measure a serving cell and/or a neighboring cell includes: The terminal device measures the serving cell when the terminal device fails to receive the data after N2 retransmissions, and the terminal device measures the neighboring cell when the terminal device fails to receive the data after N3 retransmissions.

With reference to the third aspect, in some implementations of the third aspect, the method further includes: sending capability information of the terminal device.

According to a fourth aspect, a cell measurement method is provided. The method may be performed by a network device, or may be performed by a chip or a circuit configured in a network device. This is not limited in this application.

The method may include: generating transmission quality configuration information, and sending the transmission quality configuration information. The transmission quality configuration information is used by a terminal device to determine whether to measure a serving cell and/or a neighboring cell, and both the serving cell and the neighboring cell are satellite cells.

With reference to the fourth aspect, in some implementations of the fourth aspect, the transmission quality configuration information includes a quantity N1 of retransmissions of data, the quantity N1 of retransmissions of the data is used by the terminal device to determine whether to measure the serving cell and/or the neighboring cell, and N1 is an integer greater than 0.

Optionally, when the terminal device fails to receive (or fails to demodulate) the data after N1 retransmissions, the terminal device may start measurement on the serving cell.

Optionally, when the terminal device fails to receive (or fails to demodulate) the data after N1 retransmissions, the terminal device may start measurement on the neighboring cell.

With reference to the fourth aspect, in some implementations of the fourth aspect, the transmission quality configuration information includes a quantity N2 and a quantity N3 of retransmissions of the data. The quantity N2 of retransmissions of the data is used by the terminal device to determine whether to measure the serving cell, and the quantity N3 of retransmissions of the data is used by the terminal device to determine whether to measure the neighboring cell. Both N2 and N3 are integers greater than 0.

With reference to the fourth aspect, in some implementations of the fourth aspect, capability information of the terminal device is received.

According to a fifth aspect, a cell measurement method is provided. The method may be performed by a terminal device, or may be performed by a chip or a circuit configured in a terminal device. This is not limited in this application.

The method may include: The terminal device obtains distance information; and the terminal device determines, based on the distance information and a location of the terminal device, whether to measure a serving cell and/or a neighboring cell, where both the serving cell and the neighboring cell are satellite cells.

Optionally, the terminal device may be in a connected state.

Optionally, that the terminal device determines whether to measure a serving cell includes: The terminal device determines whether to start periodic measurement on the serving cell.

Optionally, that the terminal device determines whether to measure a neighboring cell includes: The terminal device determines whether to start measurement on the neighboring cell.

The serving cell and the neighboring cell being satellite cells indicates that the serving cell is a cell deployed in a satellite network or a cell located in a satellite communications system. For example, the satellite may include a GEO satellite, or may include a LEO satellite and a MEO satellite, or may include a multi-satellite network formed by a GEO satellite and a MEO satellite. This is not limited.

Optionally, the distance information may include one or more of the following: information about a center location of the serving cell, information about at least one parameter, and area information.

Optionally, the location of the terminal device may indicate a distance between the terminal device and the center location of the serving cell. Alternatively, the location of the terminal device may indicate a geographical location of the terminal device, and the terminal device may determine a distance between the terminal device and the center location of the serving cell based on the center location of the serving cell and the geographical location of the terminal device.

Optionally, the terminal device (for example, a terminal device having a positioning capability) may determine, based on the distance (for example, a straight-line distance) between the location of the terminal device and the center location of the serving cell and with reference to the distance information, whether to measure the serving cell and/or the neighboring cell. In other words, based on the distance between the terminal device and the center location of the serving cell and with reference to the distance information, the terminal device may determine a location of the terminal device in a network coverage area of the serving cell, or determine strength of a signal that is of the serving cell and that is received by the terminal device.

For example, based on the distance between the terminal device and the center location of the serving cell and with reference to the distance information, the terminal device may determine that the terminal device may be located at a location at which a network of the serving cell is relatively strong, that is, a received signal of the serving cell is relatively strong. For example, the terminal device may be located in a center of the network coverage area of the serving cell. In this case, it indicates that quality of the serving cell in which the terminal device is currently located is relatively good, and therefore measurement on the neighboring cell may not be performed.

For another example, based on the distance between the terminal device and the center location of the serving cell and with reference to the distance information, the terminal device may determine that the terminal device may be located at a location at which a network of the serving cell is relatively weak, that is, a received signal of the serving cell is relatively weak. For example, the terminal device may be located at an edge of the network coverage area of the serving cell. In this case, it indicates that quality of the serving cell in which the terminal device is currently located is relatively poor, and therefore measurement on the neighboring cell and/or the serving cell may be performed.

Optionally, the distance information may be pre-stored, and the terminal device may read the distance information as required. Alternatively, the distance information may be configured by a network device and sent to the terminal device. This is not limited.

Optionally, the terminal device may determine the location of the terminal device in the serving cell based on the parameter in the distance information. The terminal device determines, based on the location of the terminal device in the serving cell, whether to measure the serving cell and/or the neighboring cell. This is specifically described in the following embodiments.

Based on the foregoing technical solution, whether to measure the serving cell and/or the neighboring cell may be determined based on the location. For example, measurement on the serving cell and/or the neighboring cell is started only when the terminal device is located at a location at which a cell signal is relatively poor, for example, at an edge location, to reduce measurement on the serving cell and/or the neighboring cell, and help the terminal device save power.

With reference to the fifth aspect, in some implementations of the fifth aspect, the distance information includes information about a first parameter. The determining, based on the distance information and a location of the terminal device, whether to measure a serving cell and/or a neighboring cell includes: when the distance between the terminal device and the center location of the serving cell is less than or equal to the first parameter, skipping measuring the serving cell and the neighboring cell, or measuring the serving cell and skipping measuring the neighboring cell; and measuring the serving cell and the neighboring cell when the distance between the terminal device and the center location of the serving cell is greater than the first parameter.

Optionally, a unit of the first parameter may be meter, kilometer, or the like. The first parameter may be used by the terminal device to determine, with reference to an actual distance between the terminal device and the center location of the serving cell, whether to start periodic measurement on the serving cell and/or whether to start periodic measurement on the neighboring cell.

For example, the unit of the first parameter may be meter, kilometer, or the like.

For example, the first parameter may be a specific value. For example, the first parameter includes A, and A is a number greater than 0. Alternatively, the first parameter may include a range. For example, the first parameter includes {a, b} or [a, b], and a and b are numbers greater than 0. This is not limited herein.

For example, the first parameter may be pre-specified, for example, pre-specified in a protocol, or may be configured by the network device.

Optionally, the terminal device may compare the distance between the terminal device and the center location of the serving cell with the first parameter. In an example, when the distance between the terminal device and the center location of the serving cell is less than or equal to the first parameter, it indicates that the terminal device may be located at a location at which the network of the serving cell is relatively strong, that is, a received signal of the serving cell is relatively strong. For example, the terminal device may be located in the center of the network coverage area of the serving cell. In this case, the terminal device may not measure the neighboring cell. In another example, when the distance between the terminal device and the center location of the serving cell is greater than the first parameter, it indicates that the terminal device may be located at a location at which the network of the serving cell is relatively weak, that is, a received signal of the serving cell is relatively weak. For example, the terminal device may be located at an edge of the serving cell. In this case, the terminal device may measure the neighboring cell.

Optionally, measuring the serving cell and skipping measuring the neighboring cell when the distance between the terminal device and the center location of the serving cell is less than or equal to the first parameter does not mean that the terminal device definitely does not measure the neighboring cell in this case. For example, when the distance between the terminal device and the center location of the serving cell is less than or equal to the first parameter, the terminal device measures the serving cell. When the quality of the serving cell is relatively poor, for example, the quality of the serving cell is less than a threshold, the terminal device may measure the neighboring cell.

Based on the foregoing technical solution, the terminal device determines, based on the distance between the terminal device and the center location of the serving cell and the first parameter, whether to measure the serving cell and/or the neighboring cell.

With reference to the fifth aspect, in some implementations of the fifth aspect, the distance information includes information about a second parameter and a third parameter, and a value of the second parameter is greater than a value of the third parameter. The determining, based on the distance information and a location of the terminal device, whether to measure a serving cell and/or a neighboring cell includes: skipping measuring the serving cell and the neighboring cell when the distance between the terminal device and the center location of the serving cell is less than or equal to the second parameter; measuring the serving cell and skipping measuring the neighboring cell when the distance between the terminal device and the center location of the serving cell is greater than the second parameter and less than or equal to the third parameter; and measuring the serving cell and the neighboring cell when the distance between the terminal device and the center location of the serving cell is greater than the third parameter.

Optionally, measuring the serving cell and skipping measuring the neighboring cell when the distance between the terminal device and the center location of the serving cell is greater than the second parameter and less than or equal to the third parameter does not mean that the terminal device definitely does not measure the neighboring cell in this case. For example, when the distance between the terminal device and the center location of the serving cell is greater than the second parameter and less than or equal to the third parameter, the terminal device measures the serving cell. When the quality of the serving cell is relatively poor, for example, the quality of the serving cell is less than a threshold, the terminal device may measure the neighboring cell.

Optionally, the second parameter and/or the third parameter may be used by the terminal device to determine, with reference to an actual distance between the terminal device and the center location of the serving cell, whether to start periodic measurement on the serving cell and/or whether to start periodic measurement on the neighboring cell.

For example, units of the second parameter and the third parameter may be meter, kilometer, or the like.

For example, the second parameter or the third parameter may be a specific value. For example, the second parameter or the third parameter includes A, and A is a number greater than 0. Alternatively, the second parameter or the third parameter may include a range. For example, the parameter includes {a, b} or [a, b], and a and b are numbers greater than 0. This is not limited herein.

For example, the second parameter or the third parameter may be pre-specified, for example, pre-specified in a protocol, or may be configured by the network device.

With reference to the fifth aspect, in some implementations of the fifth aspect, capability information of the terminal device is sent.

According to a sixth aspect, a cell measurement method is provided. The method may be performed by a network device, or may be performed by a chip or a circuit configured in a network device. This is not limited in this application.

The method may include: generating distance information; sending the distance information; and the distance information is used by a terminal device to determine whether to measure a serving cell and/or a neighboring cell, where both the serving cell and the neighboring cell are satellite cells.

Optionally, the terminal device may be in a connected state.

Optionally, the determining, by a terminal device, whether to measure a serving cell includes: The terminal device determines whether to start periodic measurement on the serving cell.

Optionally, the determining, by a terminal device, whether to measure a neighboring cell includes: The terminal device determines whether to start measurement on the neighboring cell.

The serving cell and the neighboring cell being satellite cells indicates that the serving cell is a cell deployed in a satellite network or a cell located in a satellite communications system. For example, the satellite may include a GEO satellite, or may include a LEO satellite and a MEO satellite, or may include a multi-satellite network formed by a GEO satellite and a MEO satellite. This is not limited.

Optionally, a location of the terminal device may indicate a distance between the terminal device and a center location of the serving cell. Alternatively, a location of the terminal device may indicate a geographical location of the terminal device, and the terminal device may determine a distance between the terminal device and a center location of the serving cell based on the center location of the serving cell and the geographical location of the terminal device.

Based on the foregoing technical solution, whether to measure the serving cell and/or the neighboring cell may be determined based on the location. For example, measurement on the serving cell and/or the neighboring cell is started only when the terminal device is located at a location at which a cell signal is relatively poor, for example, at an edge location, to reduce measurement on the serving cell and/or the neighboring cell, and help the terminal device save power.

With reference to the sixth aspect, in some implementations of the sixth aspect, the distance information includes information about a first parameter, and the first parameter is used by the terminal device to determine whether to measure the serving cell and/or the neighboring cell.

Optionally, the terminal device may compare the distance between the terminal device and the center location of the serving cell with the first parameter. In an example, when the distance between the terminal device and the center location of the serving cell is less than or equal to the first parameter, it indicates that the terminal device may be located at a location at which a network of the serving cell is relatively strong, that is, a received signal of the serving cell is relatively strong. For example, the terminal device may be located in a center of a network coverage area of the serving cell. In this case, the terminal device may not measure the neighboring cell. In another example, when the distance between the terminal device and the center location of the serving cell is greater than the first parameter, it indicates that the terminal device may be located at a location at which a network of the serving cell is relatively weak, that is, a received signal of the serving cell is relatively weak. For example, the terminal device may be located at an edge of the serving cell. In this case, the terminal device may measure the neighboring cell.

With reference to the sixth aspect, in some implementations of the sixth aspect, the distance information includes information about a second parameter and a third parameter, a value of the second parameter is greater than a value of the third parameter, and the second parameter and/or the third parameter is used by the terminal device to determine whether to measure the serving cell and/or the neighboring cell.

With reference to the sixth aspect, in some implementations of the sixth aspect, capability information of the terminal device is received.

According to a seventh aspect, a communications apparatus is provided. The communications apparatus is configured to perform the communication method provided in the first aspect, the third aspect, or the fifth aspect. Specifically, the communications apparatus may include a module configured to perform the communication method provided in the first aspect, the third aspect, or the fifth aspect. The communications apparatus may be a terminal device, a chip or a circuit configured in a terminal device, or a device including a terminal device.

According to an eighth aspect, a communications apparatus is provided. The communications apparatus is configured to perform the method provided in the second aspect, the fourth aspect, or the sixth aspect. Specifically, the communications apparatus may include a module configured to perform the method provided in the second aspect, the fourth aspect, or the sixth aspect. The communications apparatus may be a network device, a chip or a circuit configured in a network device, or a device including a network device.

According to a ninth aspect, a communications apparatus is provided, and includes a processor. The processor is coupled to a memory, and may be configured to execute instructions in the memory, to implement the method according to any possible implementation of the first aspect, the third aspect, or the fifth aspect. Optionally, the communications apparatus further includes the memory. Optionally, the communications apparatus further includes a communications interface, the processor is coupled to the communications interface, and the communications interface is configured to input and/or output information. The information includes at least one of instructions and data.

In an implementation, the communications apparatus is a terminal device. When the communications apparatus is a terminal device, the communications interface may be a transceiver or an input/output interface.

In another implementation, the communications apparatus is a chip or a chip system. When the communications apparatus is a chip or a chip system, the communications interface may be an input/output interface, or may be an input/output interface, an interface circuit, an output circuit, an input circuit, a pin, a related circuit, or the like on the chip or the chip system. The processor may alternatively be embodied as a processing circuit or a logic circuit.

In another implementation, the communications apparatus is a chip or a chip system configured in a terminal device.

Optionally, the transceiver may be a transceiver circuit. Optionally, the input/output interface may be an input/output circuit.

According to a tenth aspect, a communications apparatus is provided, and includes a processor. The processor is coupled to a memory, and may be configured to execute instructions in the memory, to implement the method according to any possible implementation of the second aspect, the fourth aspect, or the sixth aspect. Optionally, the communications apparatus further includes the memory. Optionally, the communications apparatus further includes a communications interface, the processor is coupled to the communications interface, and the communications interface is configured to input and/or output information. The information includes at least one of instructions and data.

In an implementation, the communications apparatus is a network device. When the communications apparatus is a network device, the communications interface may be a transceiver or an input/output interface.

In another implementation, the communications apparatus is a chip or a chip system. When the communications apparatus is a chip or a chip system, the communications interface may be an input/output interface, an interface circuit, an output circuit, an input circuit, a pin, a related circuit, or the like on the chip or the chip system. The processor may alternatively be embodied as a processing circuit or a logic circuit.

In another implementation, the communications apparatus is a chip or a chip system configured in a network device.

Optionally, the transceiver may be a transceiver circuit. Optionally, the input/output interface may be an input/output circuit.

According to an eleventh aspect, a computer-readable storage medium is provided. The computer-readable storage medium stores a computer program, and when the computer program is executed by a communications apparatus, the communications apparatus is enabled to implement the method according to any possible implementation of the first aspect, the third aspect, or the fifth aspect.

According to a twelfth aspect, a computer-readable storage medium is provided. The computer-readable storage medium stores a computer program, and when the computer program is executed by a communications apparatus, the communications apparatus is enabled to implement the method according to any possible implementation of the second aspect, the fourth aspect, or the sixth aspect.

According to a thirteenth aspect, a computer program product including instructions is provided. When the instructions are executed by a computer, a communications apparatus is enabled to implement the method provided in any one of the first aspect, the third aspect, or the fifth aspect.

According to a fourteenth aspect, a computer program product including instructions is provided. When the instructions are executed by a computer, a communications apparatus is enabled to implement the method provided in any one of the second aspect, the fourth aspect, or the sixth aspect.

According to a fifteenth aspect, a communications system is provided, and includes the foregoing network device and terminal device.

DETAILED DESCRIPTION OF ILLUSTRATIVE EMBODIMENTS

The following describes technical solutions of this application with reference to the accompanying drawings.

Unless otherwise defined, all technical and scientific terms used in this specification have same meanings as that usually understood by a person skilled in the art of this application. The terms used in the specification of this application are merely for the purpose of describing specific embodiments, and are not intended to limit this application.

To better understand embodiments of this application, the following first describes a communications system applicable to embodiments of this application and related concepts.

The technical solutions in embodiments of this application may be applied to various communications systems, for example, a long term evolution (LTE) system, a 5$^{th}$ generation (5G) mobile communications system, a machine to machine (M2M) communications system, a non-terrestrial network (NTN) system, or another future evolved communications system. A 5G radio air interface technology is referred to as new radio (NR), and a 5G system may also be referred to as an NR system. The NTN system may also be referred to as a satellite communications system. In addition, the non-terrestrial network system may further include a high altitude platform station (HAPS) communications system.

A terrestrial communications system sometimes cannot implement true "seamless coverage". For example, in a rural area with a low population density, there is usually not enough cellular network. For another example, in maritime and aviation areas, it is even more impossible to implement communication through a terrestrial network. Because of "ubiquitous" and "direct user-oriented" features of satellite communication, satellite communication technologies develop rapidly in the fields of satellite TV direct broadcast services, mobile satellite services, Internet access, private networks, military communication, and the like.

Based on a satellite altitude, namely, a satellite orbital altitude, a satellite system may be classified into a low earth orbit (LEO) satellite, a medium earth orbit (MEO) satellite, and a geostationary earth orbit (GEO) satellite (or referred to as a geostationary orbit satellite).

In a possible manner, a satellite altitude of the LEO satellite is about 300 km (km) to 1500 km. A satellite altitude of the MEO satellite is between those of the LEO satellite and the GEO satellite. The GEO satellite has a satellite moving speed the same as the Earth's rotation speed, and remains stationary relative to the ground, and the satellite altitude is about 35768 km. A manner of classifying the satellite system into the GEO satellite, the MEO satellite, and the LEO satellite is not limited in this embodiment of this application.

FIG. 1 to FIG. 4 are several schematic diagrams of architectures of satellite communication applicable to an embodiment of this application.

Figure 1:
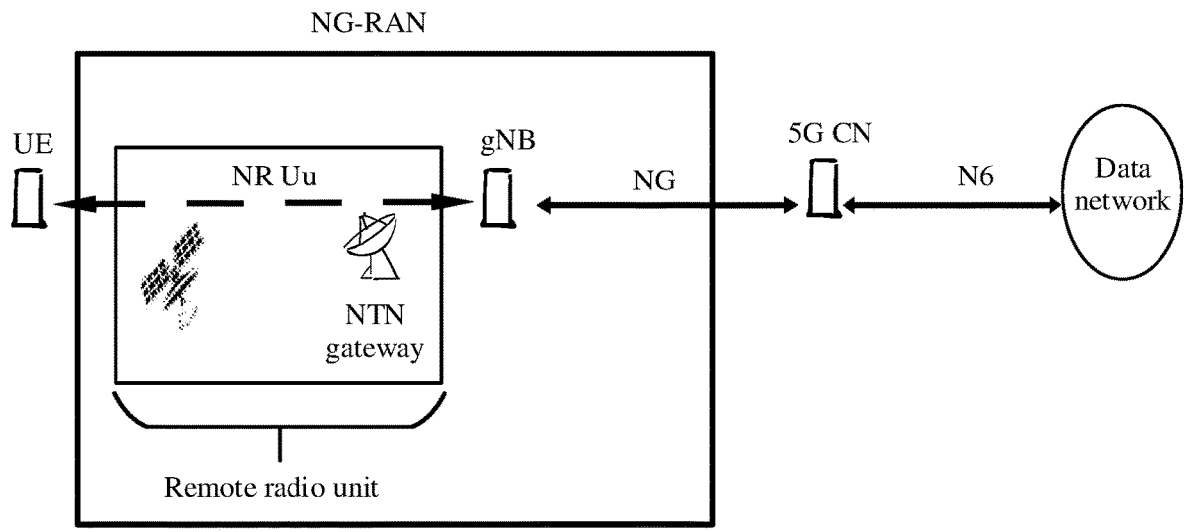
FIG. 1 to FIG. 4 are schematic diagrams of satellite communication applicable to an embodiment of this application.

FIG. 1 shows a radio access network (RAN) architecture with a transparent satellite (RAN architecture with a transparent satellite).

As shown in FIG. 1, in the scenario, user equipment (UE), a satellite, an NTN gateway, a base station (for example, an NR base station (next generation node B, gNB)), a 5G core network (CN), and a data network may be included.

The data network may be a network configured to provide data transmission, for example, an operator service network, the Internet, and a third-party service network.

The UE may be various mobile terminals, for example, a mobile satellite phone, or may be various fixed terminals, for example, a terrestrial communications station.

The terminal may be a wireless terminal or a wired terminal. The wireless terminal may be a device that provides a user with voice and/or data connectivity, a handheld device with a wireless connection function, or another processing device connected to a wireless modem. The wireless terminal may communicate with one or more core networks through a RAN. The wireless terminal may be a mobile terminal, for example, a mobile phone (or also referred to as a "cellular" phone), and a computer with a mobile terminal. For example, the wireless terminal may be a portable, pocket-size, handheld, computer-integrated or vehicle-mounted mobile apparatus, which exchanges languages and/or data with the radio access network. For example, the wireless terminal may be a device such as a personal communications service (PCS) phone, a cordless telephone, a session initiation protocol (SIP) phone, a wireless local loop (WLL) station, or a personal digital assistant (PDA). The wireless terminal may also be referred to as a system, a subscriber unit (SU), a subscriber station (SS), a mobile station (MS), a mobile, a remote station (RS), an access point (AP), a remote terminal (RT), an access terminal (AT), a user terminal (UT), a user agent (UA), a terminal device (user device, UD). The terminal device represented by a satellite phone or a vehicle-mounted satellite system may directly communicate with the satellite. The fixed terminal represented by a terrestrial communications station can communicate with the satellite only after being relayed by a ground station. A wireless transceiver antenna is installed on the terminal device to set and obtain a communication status, to complete communication.

The satellite may include a geostationary earth orbit (GEO) satellite or a non-geostationary earth orbit (NGEO) satellite (for example, a LEO satellite or a MEO satellite), or may include a multi-satellite network formed by a GEO satellite and an NGEO satellite.

In the transparent scenario shown in FIG. 1, the satellite is mainly used as a relay at a layer 1 (layer 1, L1) (L1 relay), and may regenerate a physical-layer signal, and content of the signal is invisible to a higher layer. Functions of the satellite may include but are not limited to radio frequency filtering and frequency conversion and amplification. In FIG. 1, the satellite may transmit downlink data to the terminal device.

The satellite and the NTN gateway may be used as remote radio units (RRU). The satellite may communicate with the NTN gateway through a Uu interface (for example, an NR Uu interface). The gNB may communicate with the core network through an NG interface. The core network may communicate with the data network through an N6 interface.

Figure 2:
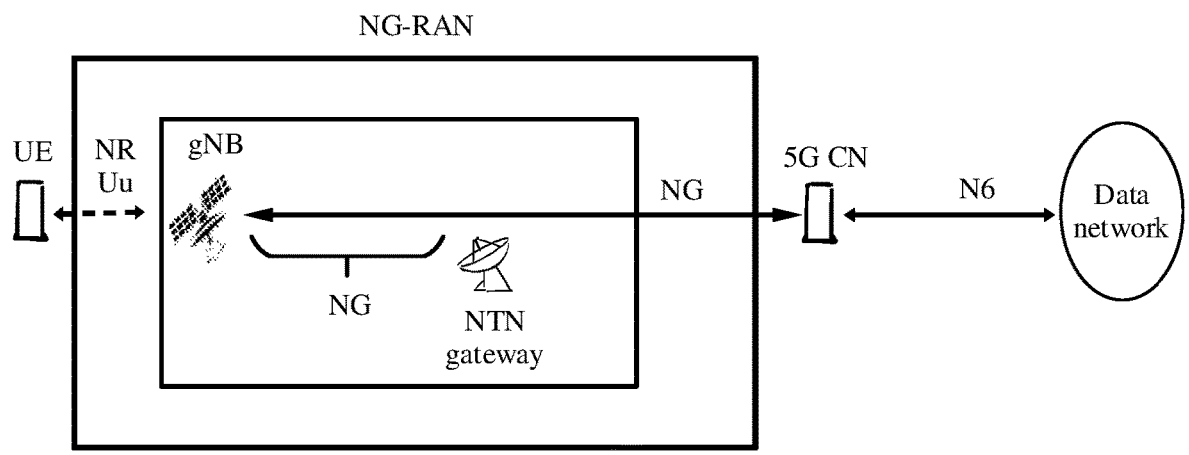

FIG. 2 shows a regenerative satellite without an inter-satellite link (ISL) (Regenerative satellite without ISL).

As shown in FIG. 2, in the scenario, UE, a satellite, an NTN gateway, a 5G core network, and a data network may be included.

For descriptions of each network element, refer to the descriptions in FIG. 1. Details are not described herein again.

In a satellite communications system, a satellite may also be referred to as a satellite base station. In the scenario shown in FIG. 2, the satellite may serve as a gNB. When the satellite serves as a gNB, functions of the satellite are similar to those of a common gNB. For example, serving as a gNB, the satellite may process a payload.

The satellite may communicate with the NTN gateway through an NG interface on a satellite radio interface (SRI). The satellite may communicate with the core network through an NG interface. The core network may communicate with the data network through an N6 interface.

A dashed line in FIG. 2 indicates a communications signal between the satellite and a terminal. In FIG. 2, the satellite base station may transmit downlink data to a terminal device. The downlink data may be transmitted to the terminal device after channel coding and modulation mapping are performed on the downlink data. The terminal device may also transmit uplink data to the satellite base station. The uplink data may also be transmitted to the terminal device after channel coding and modulation mapping are performed on the uplink data.

Solid lines in FIG. 2 indicate a communications signal between the satellite and a device that is in a ground segment and a communications signal between network elements in the ground segment.

Figure 3:
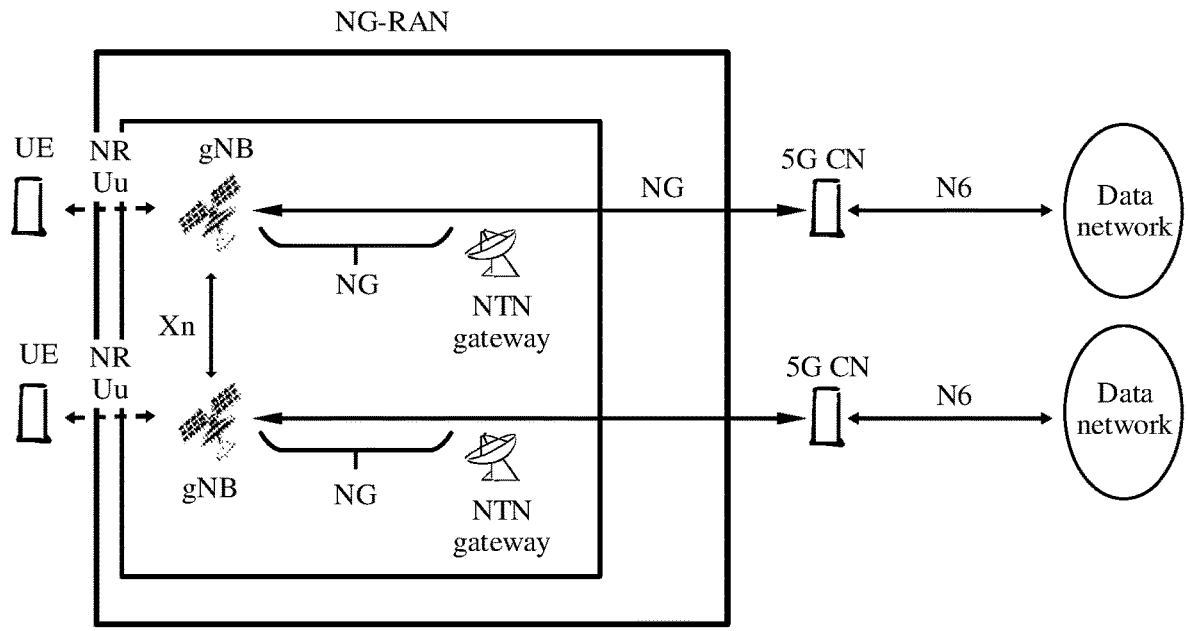

FIG. 3 shows a regenerative satellite with an ISL.

As shown in FIG. 3, in the scenario, UE, a satellite, an NTN gateway, a 5G core network, and a data network may be included.

For descriptions of each network element, refer to the descriptions in FIG. 1. Details are not described herein again.

In the scenario shown in FIG. 3, the satellite may serve as a gNB. When the satellite serves as a gNB, functions of the satellite are similar to those of a common gNB. For example, serving as a gNB, the satellite may process a payload.

In both the scenarios shown in FIG. 2 and FIG. 3, the satellite may serve as a gNB. A difference lies in that the ISL does not exist in the scenario shown in FIG. 2, but the ISL exists in the scenario shown in FIG. 3.

Satellites may communicate with each other through an Xn interface on the ISL. The satellite may communicate with the NTN gateway through an NG interface on a SRI. The satellite may communicate with the core network through an NG interface. The core network may communicate with the data network through an N6 interface.

A dashed line in FIG. 3 indicates a communications signal between the satellite and a terminal. In FIG. 3, the satellite base station may transmit downlink data to a terminal device. The downlink data may be transmitted to the terminal device after channel coding and modulation mapping are performed on the downlink data. The terminal device may also transmit uplink data to the satellite base station. The uplink data may also be transmitted to the terminal device after channel coding and modulation mapping are performed on the uplink data.

Solid lines in FIG. 3 indicate a communications signal between the satellite and a device that is in a ground segment, a communications signal between network elements in the ground segment, and a communications signal between the satellites.

Figure 4:
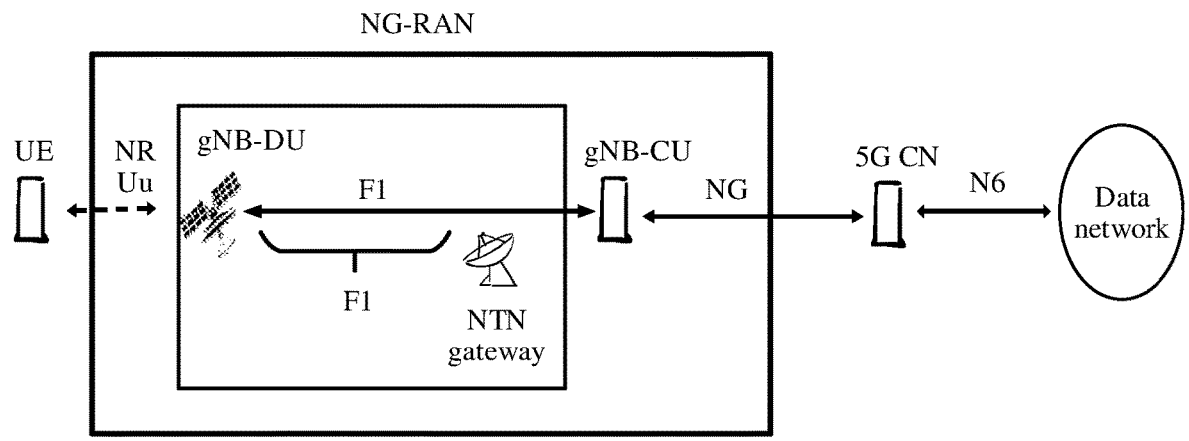

FIG. 4 shows an NG-RAN with a regenerative satellite based on gNB-DU (NG-RAN with a regenerative satellite based on gNB-DU).

As shown in FIG. 4, in the scenario, UE, a satellite, an NTN gateway, a centralized unit (CU) (for example, a gNB-CU), a 5G core network, and a data network may be included.

For descriptions of each network element, refer to the descriptions in FIG. 1. Details are not described herein again.

In the scenario shown in FIG. 4, the satellite may serve as a distributed unit (DU) (for example, a gNB-DU). When the satellite serve as a gNB-DU, functions of the satellite are similar to those of a common distributed unit (DU).

The satellite may communicate with the NTN gateway through an F1 interface on a SRI. The satellite may communicate with a gNB-CU (that is, the gNB-DU may communicate with the gNB-CU) through an F1 interface. The core network may communicate with the data network through an N6 interface.

A dashed line in FIG. 4 indicates a communications signal between the satellite and a terminal. In FIG. 4, the satellite base station may transmit downlink data to a terminal device. The downlink data may be transmitted to the terminal device after channel coding and modulation mapping are performed on the downlink data. The terminal device may also transmit uplink data to the satellite base station. The uplink data may also be transmitted to the terminal device after channel coding and modulation mapping are performed on the uplink data.

Solid lines in FIG. 4 indicate a communications signal between the satellite and a device that is in a ground segment and a communications signal between network elements in the ground segment.

It should be understood that FIG. 1 to FIG. 4 are merely examples for description, and embodiments of this application are not limited thereto. For example, more terminal devices may be included in FIG. 1 to FIG. 4. For another example, more NTN gateways may alternatively be included in FIG. 1 to FIG. 4.

It should be further understood that the foregoing describes four scenarios as examples with reference to FIG. 1 to FIG. 4. Embodiments of this application are not limited thereto. For example, the satellite may alternatively serve as an integrated access and backhaul (integrated access and backhaul, IAB) node.

The IAB node is configured to provide a wireless backhaul service for a node (for example, a terminal) wirelessly accessing a wireless backhaul node. The wireless backhaul service is a data and/or signaling backhaul service provided through a wireless backhaul link. The IAB node is a specific name of a relay node, and does not constitute a limitation on the solutions in this application. The IAB node may be the foregoing base station or terminal device having a forwarding function, or may be in an independent device form. In a network including an IAB node (which may be, for example, briefly referred to as an IAB network), the IAB node may provide a wireless access service for a terminal, and is connected to a donor base station (donor gNB) through a wireless backhaul link to transmit service data of a user.

For example, the IAB node may alternatively be a device such as customer premises equipment (CPE) or a residential gateway (RG). In this case, the method provided in embodiments of this application may further be applied to a home access scenario.

It can be learned from the foregoing that the architectures of satellite communication may generally be classified into the following two types:

One is a transparent architecture. To be specific, a satellite serves as a relay, and may perform radio frequency filtering, amplification, and the like, and regenerate a signal.

The other is a regenerative architecture. To be specific, a satellite may serve as a gNB, a DU, or a relay. In this architecture, when the satellite serves as a relay, the satellite is not just a relay. Similar to the IAB node, the satellite also has a signal processing function.

Figure 5:
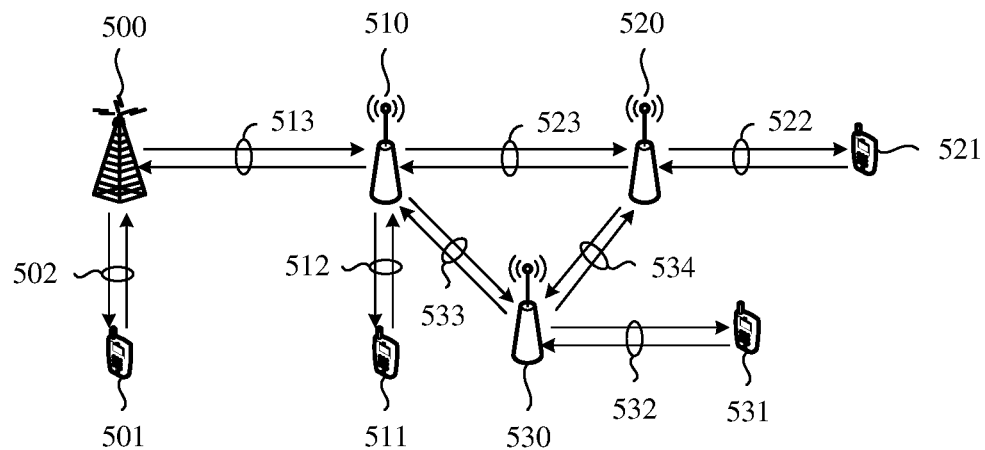
FIG. 5 and FIG. 6 are schematic diagrams of an JAB system applicable to an embodiment of this application.
Figure 6:
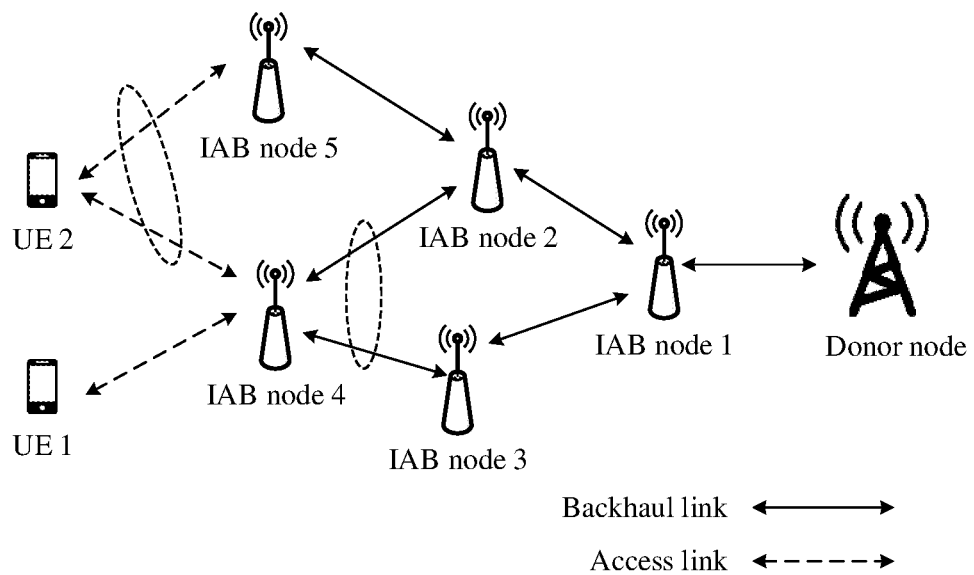

FIG. 5 and FIG. 6 are schematic diagrams of an JAB system applicable to an embodiment of this application.

In an IAB technology, a wireless transmission solution is applied to both an access link and a backhaul link, to avoid optical fiber deployment.

In an IAB network, a relay node (RN), or referred to as an IAB node, may provide a radio access service for a terminal device. Service data of the terminal device may be transmitted by one or more IAB nodes through a wireless backhaul link to a connected donor node (JAB donor) or a connected donor base station (donor gNodeB, DgNB).

As shown in FIG. 5, an IAB system includes at least: one base station 500, one or more terminal devices 501 served by the base station 500, one or more relay nodes (namely, IAB nodes) 510, and one or more terminal devices 511 served by the IAB nodes 510. The IAB node 510 is connected to the base station 500 through a wireless backhaul link 513. The base station 500 is usually referred to as a donor base station. Alternatively, the donor base station is referred to as a donor node or an IAB donor in this application. In addition, the IAB system may further include one or more intermediate IAB nodes, for example, an IAB node 520 and an IAB node 530.

The base station (for example, an access point) may refer to a device in communication with a wireless terminal via one or more sectors over an air interface in an access network. The base station device may further coordinate attribute management of the air interface. For example, the base station device may be an evolved base station in LTE or a base station or an access point in NR. This is not limited in this application. It should be understood that the base station described in embodiments of this application may be a base station device, a relay device, or another network element device having a base station function.

The donor base station may be an access network element having a complete base station function, or may be in a form in which a CU and a DU are separated, that is, the donor node includes a centralized unit of the donor base station and a distributed unit of the donor base station. In this specification, the centralized unit of the donor node is also referred to as an IAB donor CU (also referred to as a donor CU, or directly referred to as a CU). The distributed unit of the donor node is also referred to as an IAB donor DU (or referred to as a donor DU). Alternatively, the donor CU may be a form in which a control plane (CP) (referred to as a CU-CP for short in this specification) and a user plane (UP) (referred to as a CU-UP for short in this specification) are separated. For example, the CU may include one CU-CP and one or more CU-UPs.

In 5G, in consideration of a small coverage area of a high frequency band, multi-hop networking may be used in the IAB network to ensure coverage performance of the network. In consideration of a service transmission reliability requirement, the IAB node may be enabled to support dual connectivity (DC) or multi-connectivity, to cope with an exception that may occur on the backhaul link, for example, an exception such as link interruption or blockage and load fluctuation, thereby enhancing transmission reliability assurance. Therefore, the IAB network supports multi-hop networking, and may further support multi-connectivity networking.

Link: The link may indicate a path between two neighboring nodes on a path.

Access link: The access link may indicate a link between a terminal device and a base station, a link between a terminal device and an IAB node, a link between a terminal device and a donor node, or a link between a terminal device and a donor DU. Alternatively, the access link includes a wireless link used when an IAB node serves as a common terminal device to communicate with a parent node of the IAB node. When serving as a common terminal device, the IAB node does not provide a backhaul service for any child node. The access link includes an uplink access link and a downlink access link. In this application, an access link of the terminal device is a wireless link. Therefore, the access link may also be referred to as a wireless access link.

Backhaul link: The backhaul link may indicate a link between an IAB node and a parent node when the IAB node serves as a wireless backhaul node. When serving as a wireless backhaul node, the IAB node provides a wireless backhaul service for a child node. The backhaul link includes an uplink backhaul link and a downlink backhaul link. In this application, the backhaul link between the IAB node and the parent node is a wireless link. Therefore, the backhaul link may also be referred to as a wireless backhaul link.

Parent node and child node: Each IAB node considers a neighboring node that provides a wireless access service and/or a wireless backhaul service for the IAB node as a parent node. Correspondingly, the JAB node may be considered as a child node of the parent node of the IAB node.

Alternatively, the child node may also be referred to as a lower-level node, and the parent node may also be referred to as an upper-level node.

As shown in FIG. 6, a parent node of an IAB node 1 is an IAB donor, the IAB node 1 is a parent node of an IAB node 2 and an IAB node 3, the IAB node 2 and the IAB node 3 both are parent nodes of an IAB node 4, and a parent node of an IAB node 5 is the IAB node 3. An uplink data packet of UE may be transmitted to the donor node IAB donor through one or more IAB nodes, and then sent by the IAB donor to a mobile gateway device (for example, a user plane function UPF unit in a 5G core network). A downlink data packet of the UE is received by the IAB donor from the mobile gateway device, and then sent to the UE through the IAB node. There are two available paths for data transmission between UE 1 and the donor base station: the UE 1→the IAB node 4→the IAB node 3→the IAB node 1→the donor node, and the UE 1→the IAB node 4→the IAB node 2→the IAB node 1→the donor node. There are three available paths for data packet transmission between a UE 2 and the donor node: the UE 2→the IAB node 4→the IAB node 3→the IAB node 1→the donor node, the UE 2→the JAB node 4→the IAB node 2→the IAB node 1→the donor node, and the terminal 2→the IAB node 5→the IAB node 2→the IAB node 1→the donor node.

It should be understood that the IAB networking scenario shown in FIG. 6 is merely an example. In an IAB scenario in which multi-hop and multi-connectivity are combined, there are more other possibilities. For example, the IAB donor in FIG. 6 and an IAB node connected to another IAB donor form dual connectivity to serve the terminal device. The possibilities are not listed one by one herein.

A network device in embodiments of this application includes but is not limited to an evolved NodeB (eNB), a radio network controller (RNC), a NodeB (NB), a base station controller (BSC), a base transceiver station (BTS), a home base station (a home evolved NodeB, or a home node B, HNB), a baseband unit (BBU), an evolved (evolved LTE, eLTE) base station, a base station in a RAN (for example, an NR base station (next generation node B, gNB)), and the like.

The base station may be an architecture in which a centralized unit (CU) and a distributed unit (DU) are separated. The RAN may be connected to a core network (for example, an LTE core network or a 5G core network). The CU and the DU may be understood as division of the base station from a perspective of logical functions. The CU and the DU may be physically separated or deployed together.

Figures 7, 8:
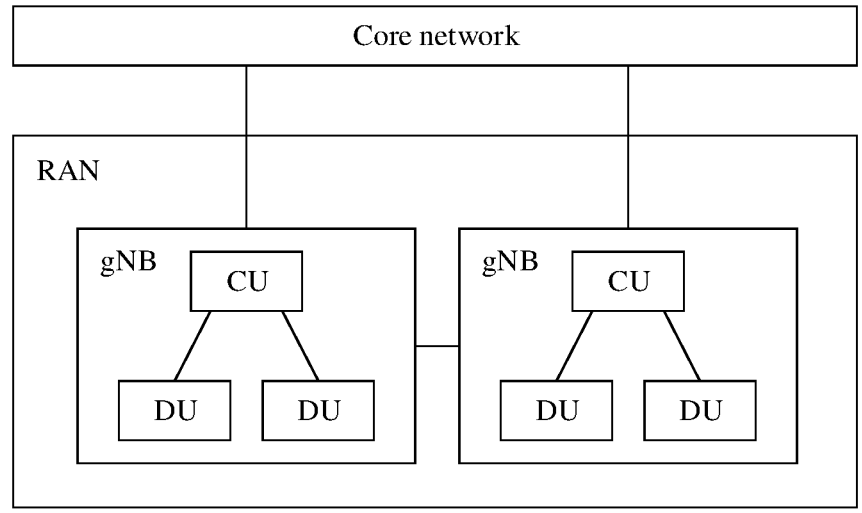
FIG. 7 is a schematic diagram of a network architecture applicable to an embodiment of this application.
FIG. 8 is a schematic diagram of a cell measurement method according to an embodiment of this application.

As shown in FIG. 7, a plurality of DUs may share one CU. One DU may alternatively be connected to a plurality of CUs (not shown in the figure). The CU and the DU may be connected through an interface, for example, an F1 interface.

The CU and the DU may be obtained through division based on protocol layers of a wireless network.

For example, in a possible division manner, the CU is configured to perform functions of a radio resource control (RRC) layer, a service data adaptation protocol (SDAP) layer, and a packet data convergence protocol (PDCP) layer, and the DU is configured to perform functions of a radio link control (RLC) layer, a media access control (MAC) layer, a physical layer, and the like.

It may be understood that, division into processing functions of the CU and the DU based on the protocol layers is merely an example, and the processing functions may alternatively be divided in another manner. This is not limited in this embodiment of this application. For example, the CU or the DU may have functions of more protocol layers through division. For another example, the CU or the DU may alternatively have some processing functions of protocol layers through division. In a design, some functions of the RLC layer and functions of a protocol layer above the RLC layer are distributed to the CU, and remaining functions of the RLC layer and functions of a protocol layer below the RLC layer are distributed to the DU. In another design, functions of the CU or the DU may alternatively be divided based on a service type or another system requirement. For example, division is performed based on a latency. Functions whose processing time needs to satisfy a latency requirement are distributed to the DU, and functions that do not need to satisfy the latency requirement are distributed to the CU. In another design, the CU may alternatively have one or more functions of a core network. One or more CUs may be disposed in a centralized manner or a separated manner. For example, the CUs may be disposed on a network side for ease of centralized management. The DU may have a plurality of radio frequency functions, or the radio frequency functions may be disposed remotely.

The functions of the CU may be implemented by one entity, or may be implemented by different entities. For example, the functions of the CU may further be divided. For example, a control plane (CP) is separated from a user plane (UP), that is, a control plane of the CU (CU-CP) is separated from a user plane of the CU (CU-UP). For example, the CU-CP and the CU-UP may be implemented by different function entities. The CU-CP and the CU-UP may be coupled to the DU to jointly implement functions of the base station.

The foregoing describes several possible scenarios applicable to embodiments of this application with reference to FIG. 1 to FIG. 7. It should be understood that this application is not limited thereto.

As described above, in a discussion about a 5G system in the $3^{rd}$ generation partnership project (3GPP) protocol, the satellite is to be used as a new access manner. In satellite communication, cell selection/reselection is based on a cell selection/reselection mechanism of a terrestrial network (TN).

For ease of understanding, concepts in embodiments of this application are first described.

1. Measurement

Mobility management is a general term of related content for ensuring that a communication link between a network device and a terminal device is not interrupted due to movement of the terminal device. Mobility management is an important part in wireless mobile communication.

Based on a state of the terminal device, mobility management may be roughly divided into two parts: mobility management in an idle state (RRC_IDLE state)/inactive state (RRC_INACTIVE state) and mobility management in a connected state (RRC_CONNECTED state). In the idle state/inactive state, mobility management mainly refers to a cell selection/reselection process. In the connected state, mobility management mainly refers to cell handover.

Both cell selection/reselection and cell handover are performed based on a measurement result. Therefore, mobility measurement is a basis of mobility management.

2. Cell Selection

When a terminal device is powered on or a radio link failure occurs, the terminal device performs a cell search process and selects a suitable cell to camp on as soon as possible. This process is referred to as "cell selection".

An example of a possible cell selection process is as follows:

In the cell search process, the terminal device reads system information of a cell, and obtains parameters such as $Q_{rxlevmeas}$, $Q_{rxlevmin}$, and $Q_{rxlevminoffset}$. The terminal device evaluates, based on a criterion S, whether the cell is a suitable cell. Once the suitable cell is found, that is, the cell meets the criterion S, the cell selection process is completed. If the cell is not a suitable cell, the terminal device continues to search until the terminal device finds the suitable cell and camps on the cell.

A formula of the criterion S is $S_{rxlev}>0$. To be specific, if an S value of a cell is greater than 0, it indicates that the cell is a suitable cell, that is, a cell suitable for camping. A calculation formula of $S_{rxlev}$ is as follows:

$$S_{rxlev}=Q_{rxlevmeas}-(Q_{rxlevmin}-Q_{rxlevminoffset})-P_{compensation}$$

Details are as follows:

$S_{rxlev}$: a cell selection receive level value obtained through calculation.

$Q_{rxlevmeas}$: a received signal strength value obtained by the terminal device through measurement, where the value is measured reference signal received power (RSRP).

$Q_{rxlevmin}$: a minimum received signal strength value required by the cell.

$P_{compensation}$: a larger value in (PEMAX−PUMAX) or 0, where PEMAX is maximum allowed transmit power set by a system when the terminal device accesses the cell, and PUMAX refers to maximum output power specified based on a level of the terminal device.

$Q_{rxlevminoffset}$: This parameter is valid only when the terminal device normally camps on a virtual private mobile network (VPMN) and periodically searches for a high-priority public land mobile network (PLMN) for cell selection evaluation, and this parameter specifies an offset of $Q_{rxlevmin}$.

It should be noted that due to evolution of the communication protocol versions, the formula of the criterion S and the calculation formula of $S_{rxlev}$ may change due to some reasons. The formulas provided herein are merely examples, and these examples constitute no limitation on the formulas. A parameter and a criterion for cell selection are not limited in embodiments of this application.

3. Cell Reselection

After a terminal device camps on a cell, with movement of the terminal device, the terminal device may need to hand over to another cell having a higher priority or a better signal for camping. This is a cell reselection process. Cell selection is a process of finding a suitable cell as soon as possible. Cell reselection is a process of selecting a more suitable cell. To save power of the terminal device, a measurement criterion is defined in a protocol and is as follows:

the terminal device always measures a frequency layer or system whose priority is higher than that of a camped cell; and if $S_{rxlev}$ of the camped cell $\leq S_{intrasearch}$, the terminal device starts measurement on an intra-frequency cell, where $S_{intrasearch}$ is an intra-frequency measurement threshold, or if $S_{rxlev}$ of the camped cell $\leq S_{nonintrasearch}$ or $S_{nonintrasearch}$ is not configured, the terminal device starts measurement on a frequency that has a same priority or a frequency and a system that have a lower priority.

After the measurement, the terminal device determines whether to perform reselection to reselect a new cell, and reselection criteria are as follows:

A reselection criterion for a frequency or system having a higher priority is that $S_{rxlev}$ of a target frequency cell $>T_{hreshx-high}$ and lasts for a period of time, where $T_{hreshx-high}$ is a threshold for reselection from a current serving carrier to the frequency having a higher priority.

A reselection criterion for a frequency or system having a lower priority is that $S_{rxlev}$ of the camped cell $<T_{hreshx-low}$ and lasts for a period of time, where $T_{hreshx-low}$ is a threshold for reselection from the current serving carrier to the frequency having a lower priority.

A reselection criterion for a frequency or system having a same priority is that a cell on the frequency having a same priority is reselected based on a ranking criterion for intra-frequency cell reselection. The ranking criterion for intra-frequency cell reselection is defined as follows, where $R_s$ is a ranking value of the current camped cell, and $R_n$ is a ranking value of a neighboring cell:

$$R_s=Q_{meas\_s}+Q_{hyst}-Q_{offset\_temp}, \text{ and } R_n=Q_{meas\_s}-Q_{offset}-Q_{offset\_temp}$$

Details are as follows:

$Q_{hyst}$: a hysteresis value used to prevent ping-pong reselection.

$Q_{meas\_s}$: a received signal strength value of the camped cell obtained by the terminal device through measurement.

$Q_{offset}$: For intra-frequency cells, when $Q_{offsets\_n}$ is valid, a value is $Q_{offsets\_n}$; otherwise, the value is 0. For inter-frequency cells, when $Q_{offsets\_n}$ is valid, a value is $Q_{offsets\_n}+Q_{offsetfrequency}$; otherwise, the value is $Q_{offsetfrequency}$.

$Q_{offset\_temp}$: This value may indicate an offset. For example, the offset may be an offset that is broadcast by a network and that is added to a cell after the terminal device fails to establish an RRC connection on the cell.

The terminal device ranks ranking values of all cells that meet the cell selection criterion S. During reselection, the terminal device does not simply reselect a cell with a best ranking, but finds a highest ranking value during ranking, and cells whose ranking values differ from the highest ranking value within a specific range (for example, x dB, where x is configurable) are considered as similar cells. In these similar cells, the terminal device reselects a cell having a largest quantity of good beams.

Generally, configuration parameters required by the currently camped cell and the neighboring cell are broadcast in a system message of the currently camped cell, so that the terminal device can obtain parameters such as $R_s$ and $R_n$ through calculation. $Q_{meas}$ is a received signal strength value of a cell obtained by the terminal device through measurement. A maximum of N beams, of each cell, whose signal strength is higher than a threshold may be used to generate cell quality, and the cell quality is used as $Q_{meas}$ after layer 3 filtering. The threshold and N are notified to the terminal device in a broadcast message, and N is an integer greater than or equal to 1. A beam higher than the threshold is considered as a good beam.

It should be noted that due to evolution of the communication protocol versions, the calculation formulas of $R_s$ and $R_1$ may change due to some reasons. The formulas provided herein are merely examples, and these examples constitute no limitation on the formulas. A parameter and a criterion for cell reselection are not limited in embodiments of this application.

In satellite communication, cell selection/reselection is based on the cell selection/reselection mechanism of the terrestrial network, and some features of satellite communication are not considered. This may cause a waste of resources and increase energy consumption.

In view of this, this application provides a method to optimize a cell selection/reselection mechanism in a satellite communication scenario, to reduce an unnecessary measurement and help a terminal device save power.

The following describes in detail embodiments provided in this application with reference to the accompanying drawings.

FIG. 8 is a schematic interaction diagram of a cell measurement method 800 according to an embodiment of this application. The method 800 may include the following steps.

810: A terminal device measures a serving cell in a first time period, where the serving cell is a satellite cell (NTN cell).

The satellite cell refers to a cell deployed in a satellite network or a cell located in a satellite communications system. For example, the satellite may include a GEO satellite. Alternatively, the satellite may include a GEO satellite and a LEO satellite, or may include a multi-satellite network formed by a GEO satellite and a MEO satellite. This is not limited.

The serving cell being a satellite cell indicates that the terminal device communicates with the satellite or the terminal device accesses the satellite communications network for communication.

The first time period may indicate time at which the terminal device measures the serving cell, or specific time at which the terminal device measures the serving cell. This is not limited. A specific duration of the first time period is not limited. Optionally, the first time period may be a time period in which a current moment is located. In other words, the terminal device measures the serving cell at the current moment. For example, the terminal device starts to measure the serving cell at the current moment. For another example, the terminal device measures the serving cell at the current moment. For another example, the terminal device stops measuring the serving cell at the current moment.

Optionally, the terminal device may be in an idle state or an inactive state.

820: When the serving cell meets a preset condition, the terminal device does not measure the serving cell within a first duration.

It may be understood that the preset condition may be used to determine whether the terminal device can measure the serving cell within the first duration. For example, when the serving cell meets the preset condition, the terminal device does not measure (or stops measuring) the serving cell within the first duration. For another example, when the serving cell does not meet the preset condition, the terminal device may measure the serving cell within the first duration.

In this embodiment of this application, that the terminal device may measure the serving cell does not mean that the terminal device definitely measures the serving cell. The terminal device may further consider another factor to determine whether to measure the serving cell, for example, whether quality of the current serving cell triggers a cell reselection procedure. This is not limited in this embodiment of this application.

The preset condition may be a pre-specified condition, for example, pre-specified in a protocol, or may be a condition indicated by a network device to the terminal device. This is not limited.

Optionally, that the serving cell meets the preset condition may include any one of the following:

(1) Quality of the Serving Cell in the First Time Period is Greater than or Equal to a First Threshold.

To be specific, based on a measurement result of the serving cell this time, if quality of the serving cell is greater than or equal to a threshold (namely, the first threshold), the terminal device does not measure the serving cell within the first duration. Alternatively, it may be understood as that when quality of the serving cell is less than a threshold (namely, the first threshold) based on a measurement result of the serving cell this time, the terminal device may measure the serving cell within the first duration.

The first threshold may be a pre-specified threshold, or a threshold configured by the network device. This is not limited. For example, the first threshold may be included in an RRC message or a broadcast message.

In this embodiment of this application, quality of the serving cell in a time period (for example, the first time period) may indicate quality of the serving cell measured by the terminal device at a time, or signal quality of the serving cell determined by the terminal device based on a specific measurement.

Cell signal quality may be represented in a plurality of manners. This is not limited in this embodiment of this application. For example, the cell signal quality may be represented by any one or more of the following: reference signal received power (RSRP), reference signal received quality (RSRQ), and a signal to interference plus noise ratio (SINR). For example, the cell signal quality may be measured by using a secondary synchronization signal (SSS).

The cell signal quality (for example, the quality of the serving cell in a time period) is not described in the following.

It should be understood that, that the terminal device does not measure the serving cell within the first duration when the quality of the serving cell in the first time period is greater than or equal to the first threshold is merely an example. For example, alternatively, when the quality of the serving cell in the first time period is greater than the first threshold, the terminal device does not measure the serving cell with the first duration; and when the quality of the serving cell in the first time period is less than or equal to the first threshold, the terminal device may measure the serving cell within the first duration.

In other words, a case in which the quality of the serving cell in the first time period is equal to the first threshold is not limited in this embodiment of this application. For example, when the quality of the serving cell in the first time period is equal to the first threshold, the terminal device may measure the serving cell within the first duration. Alternatively, when the quality of the serving cell in the first time period is equal to the first threshold, the terminal device may not measure the serving cell within the first duration.

(2) Quality of the Serving Cell in the First Time Period is Greater than or Equal to Quality of the Serving Cell in a Second Time Period.

The second time period is before the first time period. For example, the first time period and the second time period may be time for two adjacent measurements.

To be specific, when quality of the serving cell is greater than or equal to the quality of the serving cell in the second time period (for example, quality of the serving cell measured last time) based on a measurement result of the serving cell this time, the terminal device does not measure the serving cell within the first duration. Alternatively, it may be understood as that when quality of the serving cell is less than the quality of the serving cell in the second time period (for example, quality of the serving cell measured last time)

based on a measurement result of the serving cell this time, the terminal device may measure the serving cell within the first duration.

It may be understood that when the quality of the serving cell becomes better or remains unchanged compared with that measured last time (namely, a last measurement result), the terminal device does not measure the serving cell within the first duration. In other words, when a signal of the terminal device gradually becomes better or remains unchanged as the terminal device moves, the terminal device does not measure the serving cell within the first duration. Alternatively, it may be understood that when the quality of the serving cell deteriorates compared with that measured last time, the terminal device may measure the serving cell within the first duration.

It should be understood that the first time period and the second time period may be time for two adjacent measurements or time for two non-adjacent measurements. This is not limited. In other words, the terminal device does not measure the serving cell within the first duration provided that the quality of the serving cell measured this time becomes better or remains unchanged compared with a previous measurement result.

It should be further understood that, that the terminal device does not measure the serving cell within the first duration when the quality of the serving cell in the first time period is greater than or equal to the quality of the serving cell in the second time period is merely an example. For example, alternatively, when the quality of the serving cell in the first time period is greater than the quality of the serving cell in the second time period, the terminal device does not measure the serving cell with the first duration; and when the quality of the serving cell in the first time period is less than or equal to the quality of the serving cell in the second time period, the terminal device may measure the serving cell within the first duration.

In other words, a case in which the quality of the serving cell in the first time period is equal to the quality of the serving cell in the second time period is not limited in this embodiment of this application. For example, when the quality of the serving cell in the first time period is equal to the quality of the serving cell in the second time period, the terminal device may measure the serving cell within the first duration. Alternatively, when the quality of the serving cell in the first time period is equal to the quality of the serving cell in the second time period, the terminal device may not measure the serving cell within the first duration.

It should be further understood that the described condition (2) is merely a simple determining manner, and may have a plurality of variations. For example, the quality of the serving cell deteriorates compared with that measured last time, but the deterioration magnitude is very small. In this case, the terminal device does not measure the serving cell within the first duration. The following provides description with reference to (3).

(3) a Difference Between Quality of the Serving Cell in a Second Time Period and Quality of the Serving Cell in the First Time Period is Less than a Second Threshold.

The second threshold is greater than or equal to 0.

The condition (3) may be used in a scenario in which the quality of the serving cell in the second time period is higher than or equal to the quality of the serving cell in the first time period.

For brevity, the difference between the quality of the serving cell in the second time period and the quality of the serving cell in the first time period is denoted as a quality difference. The quality difference indicates a difference obtained by subtracting the quality of the serving cell in the second time period from the quality of the serving cell in the first time period.

In other words, when the quality difference is less than the second threshold, the terminal device does not measure the serving cell within the first duration. Alternatively, it may be understood as that when the quality difference is greater than or equal to the second threshold, the terminal device may measure the serving cell within the first duration.

It may be understood that if the quality of the serving cell deteriorates compared with that measured last time, but a deterioration magnitude is very small, that is, the difference is within a specific offset, the terminal device does not measure the serving cell within the first duration. In other words, if a signal of the terminal device deteriorates as the terminal device moves, but a deterioration magnitude is relatively small, the terminal device does not measure the serving cell within the first duration. Alternatively, it may be understood that when the quality of the serving cell deteriorates greatly, the terminal device may measure the serving cell within the first duration.

It should be understood that the first time period and the second time period may be time for two adjacent measurements or time for two non-adjacent measurements. This is not limited. In other words, the terminal device does not measure the serving cell within the first duration provided that although the quality of the serving cell deteriorates compared with a previous measurement result, a deterioration magnitude is very small.

In this embodiment of this application, the second threshold may be used to determine whether the quality of the serving cell deteriorates greatly in the first time period. The second threshold may be a pre-specified threshold, or a threshold configured by the network device. This is not limited.

Optionally, the second threshold may alternatively be determined based on a pre-configured second threshold and a threshold adjustment parameter. The threshold adjustment parameter is greater than 0.

In a possible implementation, the network device may configure a second threshold, and the second threshold determined by the terminal device may be a product of the configured second threshold and the threshold adjustment parameter.

It should be understood that when the threshold adjustment parameter is 1, the second threshold determined by the terminal device is the second threshold configured by the network device.

In another possible implementation, the network device may configure a second threshold, and the second threshold determined by the terminal device may be a sum of the configured second threshold and the threshold adjustment parameter. For example, the second threshold may be a sum of the configured second threshold and one or more threshold adjustment parameters.

It is assumed that the network device pre-configures a second threshold. For example, the second threshold is denoted as a second threshold #1.

For example, after a measurement, the terminal device may determine whether the quality difference is less than a sum of the second threshold #1 and one threshold adjustment parameter. If it is determined that the quality difference is less than the sum of the second threshold #1 and the threshold adjustment parameter, the serving cell is not measured within the first duration.

It should be understood that a quantity of threshold adjustment parameters selected by the terminal device to be added to the second threshold #1 is not limited in this embodiment of this application.

Optionally, the second threshold and a second duration may be sent to the terminal device by using a piece of signaling. For example, the network device sends the second threshold and the second duration to the terminal device by using RRC signaling or a broadcast message. Alternatively, the second threshold and second duration may be separately sent to the terminal device.

It should be understood that the quality difference being less than the second threshold is merely an example. For example, alternatively, when the quality difference is less than or equal to the second threshold, the terminal device does not measure the serving cell within the first duration; and when the quality difference is greater than the second threshold, the terminal device may measure the serving cell within the first duration.

In other words, a case in which the quality difference is less than the second threshold is not limited in this embodiment of this application. For example, when the quality difference is less than the second threshold, the terminal device may measure the serving cell within the first duration. Alternatively, when the quality difference is less than the second threshold, the terminal device may not measure the serving cell within the first duration.

(4) the Serving Cell Meets a Cell Selection Criterion.

It may be understood that when the terminal device just determines a cell as the serving cell, the terminal device does not measure the cell within the first duration. In other words, when the terminal device just selects a cell as the serving cell by using the cell selection criterion, the terminal device does not measure the serving cell within the first duration.

The cell selection criterion may be, for example, the criterion S described above.

It should be noted that due to evolution of the communication protocol versions, the cell selection criterion or the formula of the criterion S and the calculation formula of $S_{rxlev}$ may change due to some reasons. Regardless of changes, it may be considered that the preset condition is met provided that the cell selection criterion is met. That is, the terminal device does not measure the serving cell within the first duration.

It should be understood that the foregoing merely describes several example forms in which the serving cell meets the preset condition. These are not limited in this embodiment of this application.

In this embodiment of this application, when the quality of the serving cell becomes better or remains unchanged, or the quality deteriorates, but the deterioration magnitude is very small, the serving cell is not measured within a period of time (for example, the first duration), so as to help the terminal device save power.

The following describes the first duration in detail.

The first duration may be a period of time after the first time period. A start moment of the first duration may be any moment after the first time period. This is not limited. In addition, a time length of the first duration is not limited in this embodiment of this application. For example, the time length of the first duration may be related to a quality change status of the cell.

The terminal device does not measure the serving cell within the first duration. In other words, the terminal device does not perform measurements on the serving cell within the first duration. In other words, the terminal device cannot measure the serving cell within the first duration. Alternatively, it may be understood that after the first duration expires (or after the first duration ends), the terminal device may measure the serving cell.

It should be understood that, that the terminal device may measure the serving cell when the first duration expires does not mean that the terminal device definitely measures the serving cell when the first duration expires. When the first duration expires, the terminal device may further consider another factor to determine whether to measure the serving cell, for example, whether the quality of the current serving cell triggers the cell reselection procedure. This is not limited in this embodiment of this application.

It should be further understood that the first duration is merely a name, and does not limit the protection scope of embodiments of this application.

The following describes the first duration with reference to two cases.

Case 1: First Durations are the Same.

To be specific, after each measurement, if the terminal device determines not to measure the serving cell within a first duration, the first duration is the same. In other words, after each measurement, the terminal device determines not to measure the serving cell within a same duration.

Descriptions are provided with reference to two measurements.

It is assumed that the terminal device determines, in the first measurement, that the serving cell meets the preset condition. In this case, the terminal device does not measure the serving cell within a first duration. It is assumed that the terminal device determines, in the second measurement, that the serving cell meets the preset condition. In this case, the terminal device does not measure the serving cell within a first duration. The first durations corresponding to the two measurements are the same.

Case 2: First Durations are Different.

To be specific, after each measurement, if the terminal device determines not to measure the serving cell within a first duration, the first duration is different. In other words, after each measurement, the terminal device determines not to measure the serving cell within a different duration.

The following describes Case 2 with reference to two examples.

Example 1: A Plurality of First Durations May be Pre-Configured by the Network Device or Pre-Specified in a Protocol In a possible implementation, after each measurement, if the terminal device determines that the serving cell meets the preset condition, the terminal device may select a first duration as a duration for not measuring the serving cell. The first duration selected by the terminal device each time may be the same or different.

It is assumed that the network device pre-configures three first durations. For example, the first durations are denoted as a first duration #1, a first duration #2, and a first duration #3. Time lengths of the first duration #1, the first duration #2, and the first duration #3 are different.

For example, after the first measurement, if the terminal device determines that the serving cell meets the preset condition, the terminal device does not measure the serving cell within the first duration #1. For another example, after the second measurement, if the terminal device determines that the serving cell meets the preset condition, the terminal device does not measure the serving cell within the first duration #2. For another example, after the third measurement, if the terminal device determines that the serving cell meets the preset condition, the terminal device does not measure the serving cell within the first duration #3. For another example, after the fourth measurement, if the terminal device determines that the serving cell meets the preset condition, the terminal device does not measure the serving cell within the first duration #1.

It should be understood that a duration selected by the terminal device as the first duration is not limited in this embodiment of this application. For example, if the terminal device determines that the quality of the serving cell is far greater than the first threshold, or the quality of the serving cell is greater than the quality measured last time, the terminal device may select a relatively long duration as the first duration.

The plurality of first durations are configured, so that the terminal device can flexibly select an appropriate first duration.

Example 2: The First Duration May be Determined Based on a Duration Adjustment Parameter The duration adjustment parameter is greater than 0. The duration adjustment parameter may be pre-specified. Alternatively, the duration adjustment parameter may be configured by the network device.

For example, the network device may notify the terminal device of the first duration and the duration adjustment parameter by using a piece of signaling such as RRC signaling or a broadcast message. Alternatively, the duration adjustment parameter may be determined by the terminal device. For example, the duration adjustment parameter is determined based on a difference between quality of the serving cell in two measurements. A value of the duration adjustment parameter is not limited in this embodiment of this application.

In a possible implementation, the network device may configure a first duration, and the first duration determined by the terminal device may be a product of the configured first duration and the duration adjustment parameter.

It should be understood that when the duration adjustment parameter is 1, the first duration determined by the terminal device is the first duration configured by the network device.

In another possible implementation, the network device may configure a first duration, and the first duration determined by the terminal device may be a sum of the configured first duration and the duration adjustment parameter. For example, after each measurement, if the terminal device determines that the serving cell meets the preset condition, the terminal device adds one or more duration adjustment parameters to the configured first duration.

It is assumed that the network device pre-configures a first duration. For example, the first duration is denoted as a first duration #1.

For example, after the first measurement, if the terminal device determines that the serving cell meets the preset condition, the terminal device does not measure the serving cell within a first duration, where the first duration is a sum of the first duration #1 and one duration adjustment parameter. For another example, after the second measurement, if the terminal device determines that the serving cell meets the preset condition, the terminal device does not measure the serving cell within a first duration, where the first duration is a sum of the first duration #1 and two duration adjustment parameters. For another example, after the third measurement, if the terminal device determines that the serving cell meets the preset condition, the terminal device does not measure the serving cell within a first duration, where the first duration is a sum of the first duration #1 and three duration adjustment parameters.

It should be understood that a quantity of duration adjustment parameters selected by the terminal device to be added to the first duration #1 is not limited in this embodiment of this application. For example, if the terminal device determines that the quality of the serving cell is far greater than the first threshold, or the quality of the serving cell is greater than the quality measured last time, the terminal device may select a relatively large quantity of duration adjustment parameters to be added to the first duration #1.

It should be further understood that the foregoing two examples are merely examples for ease of understanding. Embodiments of this application are not limited thereto. Any variation that belongs to the foregoing examples falls within the protection scope of embodiments of this application.

Optionally, the first duration may be implemented by using a timer.

Optionally, when the serving cell meets the preset condition, the timer is started by using the first duration as a duration, and the serving cell is not measured during running of the timer.

Figure 9:
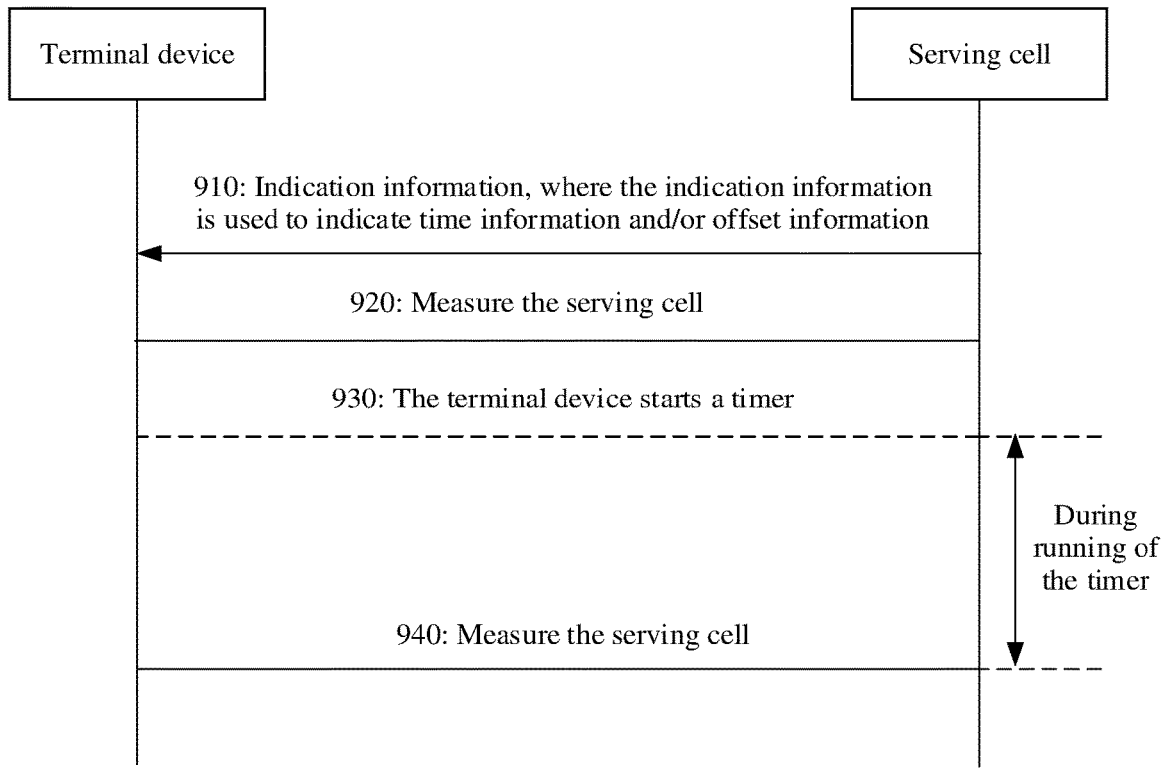
FIG. 9 is a schematic interaction diagram of a cell measurement method applicable to an embodiment of this application.

With reference to FIG. 9, the following describes a manner in which the first duration is implemented by using a timer.

A method 900 shown in FIG. 9 may include the following steps.

910: The serving cell sends indication information to the terminal device, where the indication information is used to indicate time information and/or offset information.

The serving cell is a satellite cell.

For example, the indication information may be included in an RRC release message (for example, when the terminal device enters an idle state or an inactive state from a connected state) or a broadcast message. In other words, the network device may send the time information and/or the offset information to the terminal device by using the RRC release message or the broadcast message.

The time information may include information about the first duration. For the first duration, refer to the descriptions in the method 800.

The offset information may include information about the first threshold and/or the second threshold. For the first threshold and the second threshold, refer to the descriptions in the method 800.

Optionally, the indication information may further be used to indicate information about the duration adjustment parameter and/or the threshold adjustment parameter.

For example, the network device may further send the duration adjustment parameter and/or the threshold adjustment parameter to the terminal device by using an RRC release message or a broadcast message.

For the duration adjustment parameter, refer to the descriptions of Case 2 in the method 800. For the threshold adjustment parameter, refer to the descriptions in (3) in the method 800.

920: The terminal device measures the serving cell.

This step is similar to step 810. For details, refer to the descriptions in the method 800.

Optionally, the method 900 may further include step 930.

930: The terminal device starts the timer.

The timer may be understood as an implementation of the first duration. The timer may use the first duration as a duration. For a running duration of the timer, refer to the descriptions of the first duration in the method 800.

For descriptions of whether the terminal device measures the serving cell, refer to the descriptions in the method 800.

A trigger condition of the timer may be that the serving cell meets the preset condition.

For example, the trigger condition of the timer may include any one of the following:

Condition 1: The terminal device measures the serving cell and finds that the quality of the serving cell is greater than or equal to the first threshold.

In other words, when the quality of the serving cell is greater than or equal to the first threshold, the terminal device starts the timer.

The condition 1 is similar to (1) in the method 800. For details, refer to the descriptions in the method 800.

Condition 2: The quality of the serving cell in the first time period is greater than or equal to the quality of the serving cell in the second time period.

To be specific, when the quality of the serving cell becomes better or remains unchanged compared with that measured last time (namely, the last measurement result), the terminal device starts the timer.

The condition 2 is similar to (2) in the method 800. For details, refer to the descriptions in the method 800.

Condition 3: The difference between the quality of the serving cell in the second time period and the quality of the serving cell in the first time period is less than the second threshold.

To be specific, if the quality of the serving cell deteriorates compared with that measured last time, but the deterioration magnitude is very small, that is, the difference is within the specific offset, the terminal device starts the timer.

The condition 3 is similar to (3) in the method 800. For details, refer to the descriptions in the method 800.

Condition 4: The serving cell meets the cell selection criterion.

To be specific, when the terminal device determines a cell as the serving cell by using the cell selection criterion, the terminal device starts the timer.

The condition 4 is similar to (4) in the method 800. For details, refer to the descriptions in the method 800.

It should be understood that the condition 1 to the condition 4 are merely examples for ease of understanding. Embodiments of this application are not limited thereto. For example, alternatively, when the quality of the serving cell does not trigger the reselection procedure, and the quality of the serving cell changes slightly, the timer may be started.

As shown in FIG. 9, during running of the timer, the terminal device does not measure the serving cell. When the timer expires (or times out), the terminal device may measure the serving cell.

940: The terminal device measures the serving cell.

After the timer expires, the terminal device measures the serving cell, and determines whether to repeat step 930, that is, determines whether to start the timer.

For example, the terminal device may determine, based on the condition 1, the condition 2, or the condition 3, whether to start the timer.

Optionally, it is assumed that the terminal device determines to start a timer, and a duration of the timer is the same as a duration of a last timer (that is, Case 1 in the method 800), or may be different from the duration of the last timer (that is, Case 2 in the method 800).

The following describes in detail the case in which the durations are different.

For example, a multi-level timer may be used based on the duration adjustment parameter and the threshold adjustment parameter in step 910.

For brevity, the duration adjustment parameter is denoted as a, and the threshold adjustment parameter is denoted as b.

Figure 10:
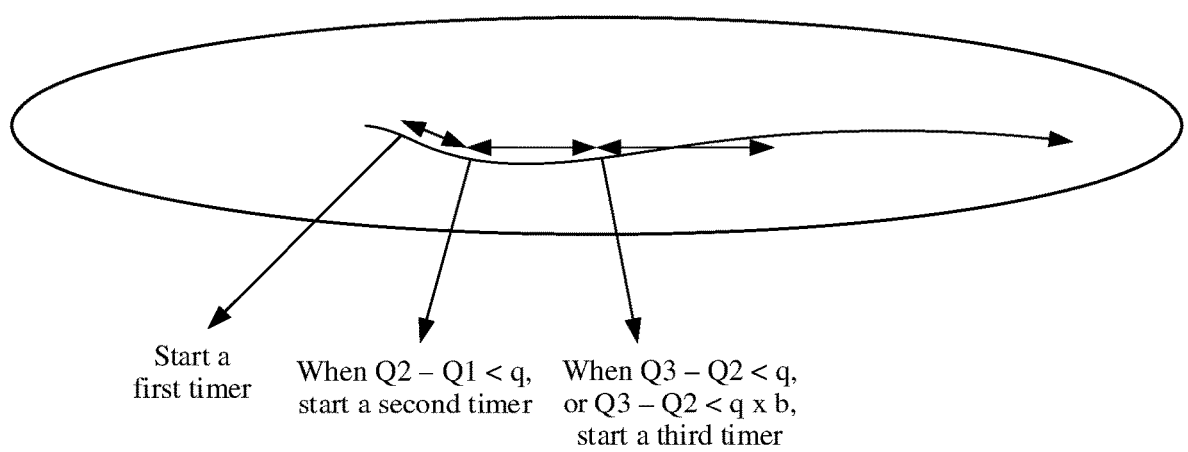
FIG. 10 is a schematic diagram of a cell measurement method applicable to an embodiment of this application.

The following describes an example with reference to FIG. 10.

For differentiation, quality of the serving cell in the first measurement is denoted as Q1, and a timer corresponding to the first measurement is denoted as a first timer; quality of the serving cell in the second measurement is denoted as Q2, and a timer corresponding to the second measurement is denoted as a second timer; and quality of the serving cell in the third measurement is denoted as Q3, and a timer corresponding to the third measurement is denoted as a third timer. The second threshold is denoted as q.

For example, the first measurement may correspond to step 920. For example, the second measurement may correspond to step 940.

The terminal device starts the first timer. If any one of the foregoing condition 1 to condition 4 is met, the terminal device starts the first timer. When the first timer runs, the terminal device does not measure the serving cell.

When the first timer expires, the terminal device may measure the serving cell. For example, the quality of the current serving cell triggers the cell reselection procedure, and the terminal device measures the serving cell.

It is assumed that the terminal device determines, based on the condition 3, whether to start the second timer.

For example, the quality of the serving cell measured by the terminal device last time minus the quality of the serving cell currently measured by the terminal device is less than the second threshold. For example, Q1−Q2<q. It may be understood that, if the signal of the terminal device deteriorates as the terminal device moves, but the deterioration magnitude is relatively small, the terminal device starts the second timer.

It should be understood that the second threshold herein may also be determined in a manner in the method 800, for example, determined by using a configured second threshold and the threshold adjustment parameter.

As shown in FIG. 10, after the first timer expires, the terminal device measures the quality of the serving cell, and when Q1−Q2<q, the terminal device starts the second timer. When the second timer runs, the terminal device does not measure the current serving cell.

For example, a duration of the second timer may be a duration of the first timer. Alternatively, a duration of the second timer may be a×a duration of the first timer. Alternatively, a duration of the second timer may be a+a duration of the first timer. Alternatively, a duration of the second timer may be (Q1−Q2)+a duration of the first timer. Alternatively, a duration of the second timer may be a×(Q1−Q2). Alternatively, a duration of the second timer may be a×(Q1−Q2)×a duration of the first timer. Alternatively, a duration of the second timer may be a×(Q1−Q2)+a duration of the first timer.

It should be understood that the duration of the second timer may be determined in a plurality of manners, and the foregoing descriptions are merely examples. For example, the duration of the second timer may be calculated based on one or more of the duration of the first timer, a, and a quality difference (for example, (Q1−Q2)).

When the second timer expires, the terminal device measures the current serving cell. The terminal device determines again whether to start the third timer.

It is assumed that the terminal device determines, based on the condition 3, whether to start the third timer.

For example, the quality of the serving cell measured by the terminal device last time minus the quality of the serving cell currently measured by the terminal device is less than the second threshold. For example, Q3−Q2<q.

For another example, the quality of the serving cell measured by the terminal device last time minus the quality of the serving cell currently measured by the terminal device is less than a second threshold, and the second threshold is a product of the configured second threshold and the threshold adjustment parameter. For example, Q3−Q2<q×b.

As shown in FIG. 10, after the second timer expires, the terminal device measures the quality of the serving cell, and when Q3−Q2<q or Q3−Q2<q×b, the terminal device starts the third timer. When the third timer runs, the terminal device does not measure the current serving cell.

It should be understood that the foregoing descriptions are merely examples, and embodiments of this application are not limited thereto. For example, the terminal device may alternatively determine, based on any one of the condition 1 to the condition 4, whether to start the timer.

It should be further understood that the foregoing provides descriptions by using an example in which the duration of each timer is different. Embodiments of this application are not limited thereto. For example, durations of the first timer, the second timer, and the third timer may be the same. For another example, durations of the first timer, the second timer, and the third timer may all be determined based on a duration configured by the network device and the duration adjustment parameter.

Based on the foregoing technical solutions, compared with the previous quality, when the quality of the serving cell becomes better or remains unchanged, or the quality of the serving cell deteriorates, but the deterioration magnitude is relatively small, the terminal device starts the timer. During running of the timer, the terminal device does not measure the serving cell. This can help the terminal device save power.

The foregoing describes, with reference to FIG. 8 to FIG. 10, that after measuring the serving cell, the terminal device determines, based on that the serving cell meets the preset condition, not to measure the serving cell in a period of time. This can help the terminal device save power.

With reference to FIG. 11 to FIG. 14, the following describes two other solutions that can help a terminal device save power.

Figure 11:
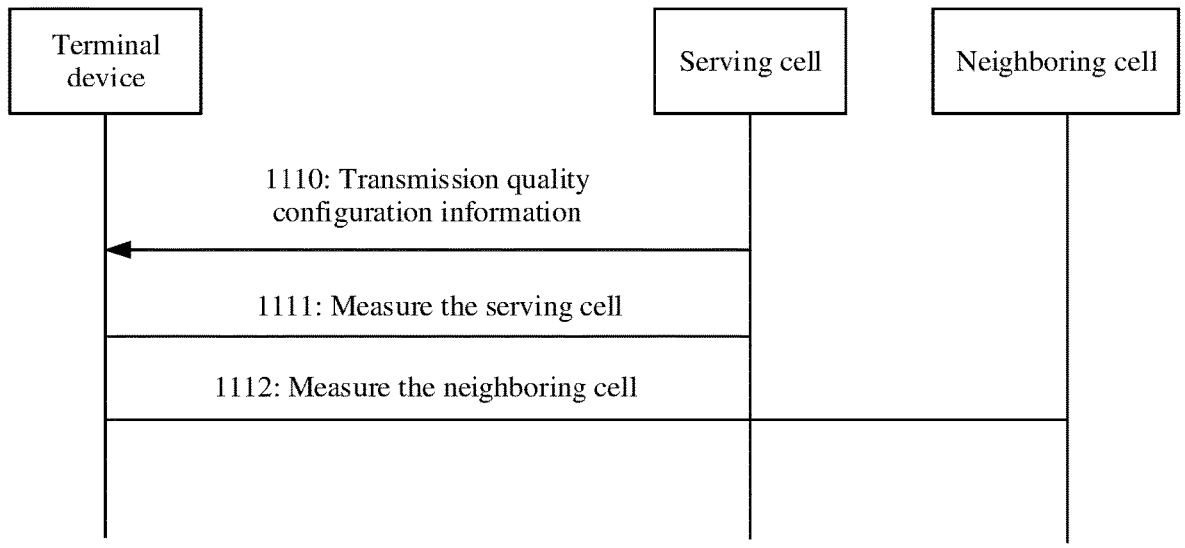
FIG. 11 is a schematic diagram of a cell measurement method according to another embodiment of this application.

FIG. 11 is a schematic diagram of a cell measurement method 1100 according to another embodiment of this application. The method 1100 may include the following steps.

1110: A terminal device receives transmission quality configuration information sent by a network device.

For example, the network device may send the transmission quality configuration information to the terminal device through a serving cell. The serving cell is a satellite cell. For a description of the satellite cell, refer to the description in the method 800.

For ease of description, interaction between the serving cell and the terminal device is used as an example for description in FIG. 11.

The terminal device may be a terminal device in a connected state.

For example, the transmission quality configuration information may include a quantity of consecutive retransmissions. The quantity of consecutive retransmissions indicates a quantity of times that data or signaling is repeatedly transmitted. For ease of description, the following uses data transmission as an example for description.

The terminal device may determine, based on the transmission quality configuration information (for example, the quantity of consecutive retransmissions) and a transmission status of data, whether to measure the serving cell and/or a neighboring cell. The neighboring cell is a satellite cell.

Optionally, before step 1110, the terminal device may report UE capability information. For example, the network device may determine, based on the UE capability information reported by the terminal device, whether the terminal device can determine, based on the transmission quality configuration information, whether to measure the serving cell and/or the neighboring cell. Alternatively, the network device may determine the quantity of consecutive retransmissions based on the UE capability information reported by the terminal device.

The following describes two possible manners in which the terminal device determines, based on the quantity of consecutive retransmissions and the transmission status of the data, whether to measure the serving cell and/or the neighboring cell.

Manner 1: The transmission quality configuration information includes a quantity N1 of consecutive retransmissions.

N1 is an integer greater than 0. A value of N1 is not limited in this embodiment of this application.

(1) The terminal device may determine, based on the quantity N1 of consecutive retransmissions and the transmission status of the data, whether to measure the serving cell.

It is assumed that the terminal device finds that the data sent by the serving cell is unsuccessfully received (or unsuccessfully demodulated) after N1 retransmissions. In this case, the terminal device starts measurement on the serving cell. That is, step 1111 is performed.

It may be understood that when transmission quality of the serving cell is relatively poor, the terminal device starts measurement on the serving cell.

1111: The terminal device measures the serving cell.

It should be understood that the terminal device is not limited herein to immediately start measurement on the serving cell. It may be indicated herein that the terminal device may start measurement on the serving cell, or the terminal device may start periodic measurement on the serving cell.

It is assumed that the terminal device finds that the data sent by the serving cell is successfully received (or successfully demodulated) when the data is retransmitted less than or equal to N1 times. In this case, the terminal device does not start measurement on the serving cell.

(2) The terminal device may determine, based on the quantity N1 of consecutive retransmissions and the transmission status of the data, whether to measure the neighboring cell.

It is assumed that the terminal device finds that the data sent by the serving cell is unsuccessfully received (or unsuccessfully demodulated) after N1 retransmissions. In this case, the terminal device starts measurement on the neighboring cell. That is, step 1112 is performed.

It may be understood that when the transmission quality of the serving cell is relatively poor, the terminal device starts measurement on the neighboring cell.

1112: The terminal device measures the neighboring cell.

It should be understood that the terminal device is not limited herein to immediately start measurement on the neighboring cell. It may be indicated herein that the terminal device may start measurement on the neighboring cell.

It is assumed that the terminal device finds that the data sent by the serving cell is successfully received (or successfully demodulated) when the data is retransmitted less than or equal to N1 times. In this case, the terminal device does not start measurement on the neighboring cell.

(3) The terminal device may determine, based on the quantity N1 of consecutive retransmissions and the transmission status of the data, whether to measure the serving cell and the neighboring cell.

It is assumed that the terminal device finds that the data sent by the serving cell is unsuccessfully received (or unsuccessfully demodulated) after N1 retransmissions. In this case, the terminal device starts measurement on the serving cell and the neighboring cell. That is, step 1111 and step 1112 are performed.

It is assumed that the terminal device finds that the data sent by the serving cell is successfully received (or successfully demodulated) when the data is retransmitted less than or equal to N1 times. In this case, the terminal device does not start measurement on the serving cell and the neighboring cell.

It may be understood that when the transmission quality of the serving cell is relatively poor, the terminal device starts measurement on the serving cell and the neighboring cell.

Manner 2: The transmission quality configuration information includes a quantity N2 and a quantity N3 of consecutive retransmissions.

Both N2 and N3 are integers greater than 0. Values of N2 and N3 are not limited in this embodiment of this application. For example, N2 is less than or equal to N3.

The terminal device may determine, based on the quantity N2 of consecutive retransmissions and the transmission status of the data, whether to measure the serving cell, and the terminal device may determine, based on the quantity N3 of consecutive retransmissions and the transmission status of the data, whether to measure the neighboring cell.

It is assumed that the terminal device finds that the data sent by the serving cell is unsuccessfully received (or unsuccessfully demodulated) after N2 retransmissions. In this case, the terminal device starts measurement on the serving cell. That is, step 1111 is performed. It is assumed that the terminal device finds that the data sent by the serving cell is unsuccessfully received (or unsuccessfully demodulated) after N3 retransmissions. In this case, the terminal device starts measurement on the neighboring cell. That is, step 1112 is performed.

It should be understood that the quantity of retransmissions is used to represent the transmission quality in the foregoing descriptions. For example, the data being unsuccessfully received after a plurality of retransmissions indicates that the transmission quality of the serving cell is relatively poor. Embodiments of this application are not limited thereto.

For example, the terminal device sends the data to the network device (for example, the serving cell). If the data is unsuccessfully sent for N4 times, or the network device fails to receive the data, the terminal device starts measurement on the serving cell. N4 is a number greater than or equal to 1. A value of N4 is not limited in this embodiment of this application. For example, N4 may be pre-specified, for example, specified in a protocol, or may be configured by the network device.

For another example, the terminal device sends the data to the network device (for example, the serving cell). If the data is unsuccessfully sent for N5 times, or the network device fails to receive the data, the terminal device starts measurement on the neighboring cell. N5 is a number greater than or equal to 1. A value of N5 is not limited in this embodiment of this application. For example, N5 may be pre-specified, for example, specified in a protocol, or may be configured by the network device.

It should be understood that any manner in which the transmission quality can be represented falls within the protection scope of embodiments of this application.

The foregoing describes a transmission quality-based measurement mechanism with reference to FIG. 11. To be specific, measurement on the serving cell and/or the neighboring cell is started when the transmission quality of the serving cell is relatively poor, to reduce measurement on the serving cell and/or the neighboring cell, and help the terminal device save power.

Figure 12:
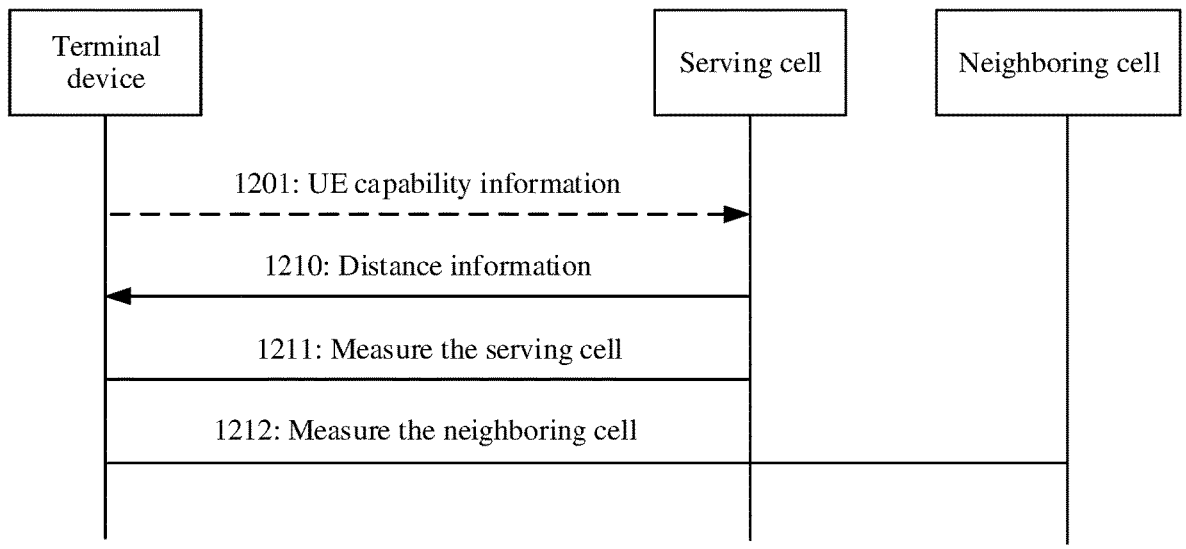
FIG. 12 is a schematic diagram of a cell measurement method according to another embodiment of this application.
Figure 13:
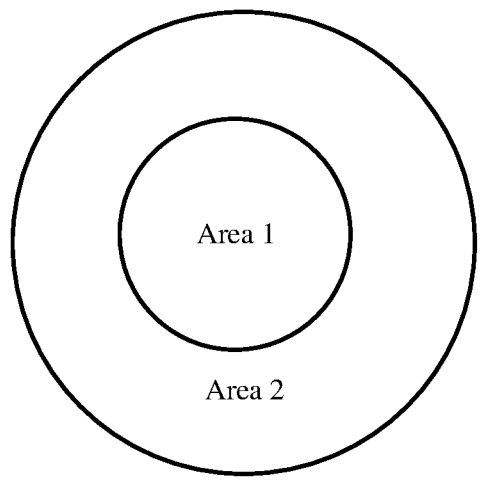
FIG. 13 and FIG. 14 are schematic diagrams of area division applicable to another embodiment of this application.
Figure 14:
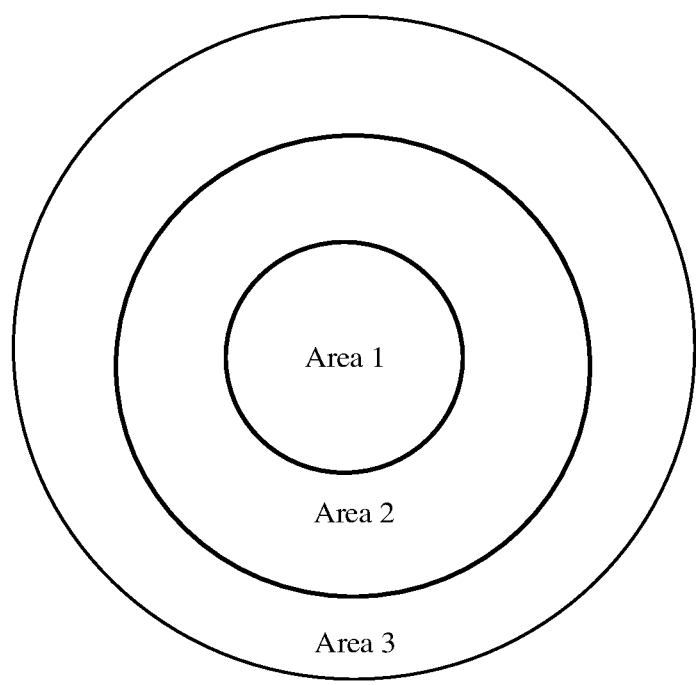

With reference to FIG. 12 to FIG. 14, the following describes another solution that can help a terminal device save power.

FIG. 12 is a schematic diagram of a cell measurement method 1200 according to another embodiment of this application. The method 1200 may include the following steps.

1210: A terminal device receives distance information sent by a network device.

Optionally, the terminal device may be a terminal device in a connected state.

Optionally, the terminal device may be a terminal device having a positioning capability. For example, the terminal device is a terminal device having a global navigation satellite system (GNSS).

The network device sends the distance information to the terminal device, and the distance information may be included in an RRC message (for example, an RRC reconfiguration message) or a broadcast message.

For example, the network device may send the distance information to the terminal device through a serving cell. The serving cell is a satellite cell. For a description of the satellite cell, refer to the description in the method 800. For ease of description, interaction between the serving cell and the terminal device is used as an example for description in FIG. 12.

Optionally, the distance information may include one or more of the following: information about a center location of the serving cell, information about at least one parameter, and area information.

For example, the distance information may include the information about the center location of the serving cell. The center location of the serving cell may be identified by geographical coordinates, for example, by longitude and latitude. The terminal device, for example, a terminal device having a positioning function, may determine an actual distance (for example, a straight-line distance) between the terminal device and the center location of the serving cell based on the center location of the serving cell and a geographical location of the terminal device.

For example, the distance information may include the information about at least one parameter. The at least one parameter, or one or more parameters, may be used by the terminal device to determine, with reference to an actual distance between the terminal device and the center location of the serving cell, whether to start periodic measurement on the serving cell and/or whether to start periodic measurement on a neighboring cell.

A unit of the parameter may be meter, kilometer, or the like. The parameter may be preset, or may be configured by the network device. This is not limited.

The parameter may be a specific value. For example, the parameter includes A, and A is a number greater than 0. Alternatively, the parameter may be a range. For example, the parameter includes {a, b} or [a, b], and a and b are numbers greater than 0. This is not limited herein.

For example, the distance information may include the area information. This is described in detail below.

It should be understood that the distance information is merely a name for description. For example, the distance information may also be referred to as area information, location information, or the like. This constitutes no limitation on the protection scope of embodiments of this application.

For example, the distance information may be sent to the terminal device by using an RRC message or a broadcast message.

The terminal device may determine, based on the distance information and a location of the terminal device, whether to start periodic measurement on the serving cell and/or whether to start periodic measurement on the neighboring cell.

In other words, in this embodiment of this application, the terminal device may determine, based on the location, whether to start measurement on the serving cell and/or the neighboring cell.

Optionally, before step 1210, the method 1200 may further include step 1201.

1201: The terminal device sends UE capability information to the serving cell.

The terminal device reports the UE capability information to the serving cell, and the UE capability information may include first capability information and/or second capability information. The first capability information may be used to indicate that the terminal device may determine, based on the location, whether to perform measurement. The second capability information may be used to indicate whether the terminal device has the positioning function. For example, the second capability information may be used to indicate whether the terminal device supports the GNSS. Optionally, the first capability information and the second capability information may alternatively be represented by using same capability information.

The terminal device may determine, based on the distance information and the location of the terminal device, whether to start periodic measurement on the serving cell and/or whether to start periodic measurement on the neighboring cell.

Optionally, the location of the terminal device may indicate a distance between the terminal device and the center location of the serving cell. Alternatively, the location of the terminal device may indicate the geographical location of the terminal device, and the terminal device may determine a distance (for example, a straight-line distance) between the terminal device and the center location of the serving cell based on the center location of the serving cell and the geographical location of the terminal device.

For example, a location of the terminal device in a network coverage area of the serving cell may also be estimated based on the distance between the terminal device and the center location of the serving cell.

The terminal device may determine, based on the distance between the terminal device and the center location of the serving cell and with reference to the distance information, whether to start periodic measurement on the serving cell and/or whether to start periodic measurement on the neighboring cell.

The following describes two possible designs by using examples.

(1) The distance information may include a first parameter. A unit of the first parameter may be meter, kilometer, or the like, and the first parameter may be a number greater than 0.

For example, when the distance between the terminal device and the center location of the serving cell is less than or equal to the first parameter, the serving cell and the neighboring cell are not measured, or the serving cell is measured and the neighboring cell is not measured.

The distance between the terminal device and the center location of the serving cell being less than or equal to the first parameter may indicate that the terminal device is located at a location at which a network of the serving cell is relatively strong or a signal of the serving cell is relatively good (for example, a signal of the serving cell received by the terminal device is strong). For example, the terminal device being located in a center of the network coverage area of the serving cell indicates that quality of the serving cell in which the terminal device is currently located is relatively good, and therefore measurement on the neighboring cell may not be performed.

For another example, when the distance between the terminal device and the center location of the serving cell is greater than the first parameter, the serving cell and the neighboring cell are measured.

The distance between the terminal device and the center location of the serving cell being greater than the first parameter may indicate that the terminal device is located at a location at which a network of the serving cell is relatively weak or a signal of the serving cell is relatively poor (for example, a signal of the serving cell received by the terminal device is weak). For example, the terminal device being located at an edge of the network coverage area of the serving cell indicates that quality of the serving cell in which the terminal device is currently located is relatively poor, and therefore the terminal device may measure the neighboring cell and the serving cell.

It should be understood that measuring the serving cell and skipping measuring the neighboring cell when the distance between the terminal device and the center location of the serving cell is less than or equal to the first parameter does not mean that the terminal device definitely does not measure the neighboring cell in this case. For example, when the distance between the terminal device and the center location of the serving cell is less than or equal to the first parameter, the terminal device measures the serving cell. When quality of the serving cell is relatively poor, for example, the quality of the serving cell is less than a threshold, the terminal device may measure the neighboring cell.

It should be further understood that a case in which the distance between the terminal device and the center location of the serving cell is equal to the first parameter is not limited. For example, when the distance between the terminal device and the center location of the serving cell is equal to the first parameter, the serving cell and the neighboring cell may be measured, or the serving cell and the neighboring cell may not be measured, or the serving cell may be measured and the neighboring cell may not be measured.

It should be understood that the first parameter may alternatively be a value range. This is not limited. For example, the first parameter includes {a, b}, and a and b are numbers greater than 0. For example, when the distance between the terminal device and the center location of the serving cell is less than or equal to a, the terminal device does not measure the serving cell and the neighboring cell. When the distance between the terminal device and the center location of the serving cell is greater than a and less than or equal to b, the terminal device measures the serving cell and does not measure the neighboring cell. When the distance between the terminal device and the center location of the serving cell is greater than b, the terminal device measures the serving cell and the neighboring cell.

(2) The distance information may include a second parameter and a third parameter. Units of the second parameter and the third parameter may be meter, kilometer, or the like, and the second parameter and the third parameter are numbers greater than 0.

For example, when the distance between the terminal device and the center location of the serving cell is less than or equal to the second parameter, the serving cell and the neighboring cell are not measured.

The distance between the terminal device and the center location of the serving cell being less than or equal to the second parameter may indicate that the terminal device is located at a location at which a network of the serving cell is relatively strong or a signal of the serving cell is relatively good (for example, a signal of the serving cell received by the terminal device is strong). For example, the terminal device being located in a center of the network coverage area of the serving cell indicates that quality of the serving cell in which the terminal device is currently located is relatively good, and therefore measurement on the neighboring cell may not be performed.

For another example, when the distance between the terminal device and the center location of the serving cell is greater than the second parameter and less than or equal to the third parameter, the serving cell is measured and the neighboring cell is not measured.

It should be understood that measuring the serving cell and skipping measuring the neighboring cell when the distance between the terminal device and the center location of the serving cell is greater than the second parameter and less than or equal to the third parameter does not mean that the terminal device definitely does not measure the neighboring cell in this case. For example, when the distance between the terminal device and the center location of the serving cell is greater than the second parameter and less than or equal to the third parameter, the terminal device measures the serving cell. When quality of the serving cell is relatively poor, for example, the quality of the serving cell is less than a threshold, the terminal device may measure the neighboring cell.

For another example, when the distance between the terminal device and the center location of the serving cell is greater than the third parameter, the serving cell and the neighboring cell are measured.

The distance between the terminal device and the center location of the serving cell being greater than the third parameter may indicate that the terminal device is located at a location at which a network of the serving cell is relatively weak or a signal of the serving cell is relatively poor (for example, a signal of the serving cell received by the terminal device is weak). For example, the terminal device being located at an edge of the network coverage area of the serving cell indicates that quality of the serving cell in which the terminal device is currently located is relatively poor, and therefore the terminal device may measure the neighboring cell and the serving cell.

It should be understood that a case in which the distance between the terminal device and the center location of the serving cell is equal to the second parameter or the third parameter is not limited. For example, when the distance between the terminal device and the center location of the serving cell is equal to the second parameter, the serving cell may not be measured, or the serving cell may be measured and the neighboring cell may not be measured, or the serving cell and the neighboring cell may be measured.

It should be further understood that the second parameter or the third parameter may alternatively be a value range. This is not limited.

It should be further understood that the foregoing are merely two possible designs, and embodiments of this application are not limited thereto. For example, the distance information may further include a greater quantity of parameters, and then the terminal device determines, based on the distance between the terminal device and the center location of the serving cell and with reference to the parameters, whether to measure the serving cell and/or the neighboring cell.

It is assumed that based on the distance between the terminal device and the center location of the serving cell and with reference to the distance information, the terminal device determines to measure the serving cell. In this case, the method 1200 may further include the following step 1211. It is assumed that based on the distance between the terminal device and the center location of the serving cell and with reference to the distance information, the terminal device determines to measure the neighboring cell. In this case, the method 1200 may further include the following step 1212.

1211: The terminal device measures the serving cell.

It should be understood that the terminal device is not limited herein to immediately start measurement on the serving cell. It may be indicated herein that the terminal device may start measurement on the serving cell, or the terminal device may start periodic measurement on the serving cell.

1212: The terminal device measures the neighboring cell.

It should be understood that the terminal device is not limited herein to immediately start measurement on the neighboring cell. It may be indicated herein that the terminal device may start measurement on the neighboring cell.

In the method 1200, the terminal device may determine, based on the distance between the terminal device and the center location of the serving cell and with reference to the distance information, whether to measure the serving cell and/or the neighboring cell.

For example, the distance information may include the area information. This is described in detail below.

Optionally, the terminal device may determine the location of the terminal device in the serving cell based on the parameter in the distance information. The terminal device determines, based on the location of the terminal device in the serving cell, whether to measure the serving cell and/or the neighboring cell. The location of the terminal device in the serving cell indicates whether the terminal device is located at the location at which the network of the serving cell is relatively strong or weak, or whether the signal of the serving cell received by the terminal device is relatively strong or weak. For example, the terminal device being located at the location at which the network of the serving cell is relatively strong or the signal of the serving cell is relatively good, for example, the center of the network coverage area of the serving cell, indicates that the quality of the serving cell in which the terminal device is currently located is relatively good, and therefore measurement on the neighboring cell may not be performed. For another example, the terminal device being located at the location at which the network of the serving cell is relatively weak or the signal of the serving cell is relatively poor, for example, the edge of the network coverage area of the serving cell, indicates that the quality of the serving cell in which the terminal device is currently located is relatively poor, and therefore the terminal device may measure the neighboring cell and the serving cell.

For example, the serving cell may be logically divided into a plurality of areas. For example, division is performed based on a distance to the center location of the serving cell. Some areas are located at the center location of the serving cell, and some areas are located at the edge of the serving cell. Alternatively, it may be understood that cell signals of the plurality of divided areas are different, or distances between the plurality of divided areas and the center location of the serving cell are different. For example, cell signals in some areas are relatively good, for example, the areas located at the center location of the serving cell. For another example, cell signals in some areas are relatively poor, for example, the areas located at the edge of the serving cell.

The following provides examples for description with reference to FIG. 13 and FIG. 14.

As shown in FIG. 13, it is assumed that the serving cell is divided into two areas. For example, the areas are denoted as an area 1 and an area 2. The area 1 is close to the center of the serving cell, and the area 2 is far from the center of the serving cell. It should be understood that the areas may further be more finely divided. Herein, two areas, the area 1 and the area 2, are used as examples for description.

It is assumed that the distance information may include the first parameter. Optionally, the distance information may also include the area information, that is, the distance information may further include information about the area 1 and the area 2.

In a possible design, the distance between the terminal device and the center location of the serving cell being less than or equal to the first parameter indicates that the terminal device is in the area 1, and the distance between the terminal device and the center location of the serving cell being greater than the first parameter indicates that the terminal device is in the area 2.

In another possible design, the distance between the terminal device and the center location of the serving cell being less than the first parameter indicates that the terminal device is in the area 1, and the distance between the terminal device and the center location of the serving cell being greater than or equal to the first parameter indicates that the terminal device is in the area 2.

For example, when determining that the terminal device is located in the area 1, the terminal device measures only the serving cell and does not measure the neighboring cell. In other words, when the quality of the serving cell is relatively good, the terminal device may not measure the neighboring cell. For another example, when determining that the terminal device is located in the area 2, the terminal device measures both the serving cell and the neighboring cell. In other words, when the quality of the serving cell is relatively poor, the terminal device may measure both the neighboring cell and the serving cell.

For another example, when determining that the terminal device is located in the area 1, the terminal device measures neither the serving cell nor the neighboring cell. In other words, when the quality of the serving cell is relatively good, the terminal device may not measure the neighboring cell and the serving cell. For another example, when determining that the terminal device is located in the area 2, the terminal device measures both the serving cell and the neighboring cell. In other words, when the quality of the serving cell is relatively poor, the terminal device may measure both the neighboring cell and the serving cell.

As shown in FIG. 14, it is assumed that the serving cell is divided into three areas. For example, the areas are denoted as an area 1, an area 2, and an area 3. The area 1 is closest to the center of the serving cell, the area 3 is farthest from the center of the serving cell and is close to the edge of the serving cell, and the area 2 is located between the area 1 and the area 3. It should be understood that the areas may further be more finely divided. Herein, three areas, the area 1, the area 2, and the area 3, are used as examples for description.

It is assumed that the distance information may include the second parameter and the third parameter. Optionally, the distance information may also include the area information, that is, the distance information may further include information about the area 1, the area 2, and the area 3.

In a possible design, the distance between the terminal device and the center location of the serving cell being less than or equal to the second parameter indicates that the terminal device is in the area 1; the distance between the terminal device and the center location of the serving cell being greater than the second parameter and less than or equal to the third parameter indicates that the terminal device is in the area 2; and the distance between the terminal device and the center location of the serving cell being greater than the third parameter indicates that the terminal device is in the area 3.

In another possible design, the distance between the terminal device and the center location of the serving cell being less than the second parameter indicates that the terminal device is in the area 1; the distance between the terminal device and the center location of the serving cell being greater than or equal to the second parameter and less than or equal to the third parameter indicates that the terminal device is in the area 2; and the distance between the terminal device and the center location of the serving cell being greater than the third parameter indicates that the terminal device is in the area 3.

In another possible design, the distance between the terminal device and the center location of the serving cell being less than or equal to the second parameter indicates that the terminal device is in the area 1; the distance between the terminal device and the center location of the serving cell being greater than the second parameter and less than the third parameter indicates that the terminal device is in the area 2; and the distance between the terminal device and the center location of the serving cell being greater than or equal to the third parameter indicates that the terminal device is in the area 3.

In another possible design, the distance between the terminal device and the center location of the serving cell being less than the second parameter indicates that the terminal device is in the area 1; the distance between the terminal device and the center location of the serving cell being greater than or equal to the second parameter and less than the third parameter indicates that the terminal device is in the area 2; and the distance between the terminal device and the center location of the serving cell being greater than or equal to the third parameter indicates that the terminal device is in the area 3.

For example, when determining that the terminal device is located in the area 1, the terminal device measures neither the serving cell nor the neighboring cell. In other words, when the quality of the serving cell is relatively good, the terminal device may not measure the neighboring cell and the serving cell. For another example, when determining that the terminal device is located in the area 2, the terminal device measures only the serving cell and does not measure the neighboring cell. For another example, when determining that the terminal device is located in the area 3, the terminal device measures both the serving cell and the neighboring cell. In other words, when the quality of the serving cell is relatively poor, the terminal device may measure both the neighboring cell and the serving cell.

It should be understood that, that the terminal device measures the serving cell and does not measure the neighboring cell when determining that the terminal device is located in the area 2 does not mean that the terminal device definitely does not measure the neighboring cell when the terminal device is in the area 2. For example, when determining that the terminal device is located in the area 2, the terminal device measures the serving cell. When the quality of the serving cell is relatively poor, for example, the quality of the serving cell is less than a threshold, the terminal device may measure the neighboring cell. Alternatively, when the terminal device senses that the quality of the serving cell is poor, the terminal device may measure the neighboring cell.

It should be further understood that area division is not limited in this embodiment of this application. In the method 1200, it may be determined, through area division, whether the terminal device is located at a location at which a cell signal is relatively good. For example, measurement on the serving cell and/or the neighboring cell is started only when the terminal device is located at a location at which a cell signal is relatively poor.

The foregoing describes a location-based measurement mechanism with reference to FIG. 12 to FIG. 14. To be specific, measurement on the serving cell and/or the neighboring cell is started only when the terminal device is located at the location at which the cell signal is relatively poor, for example, at an edge location, to reduce measurement on the serving cell and/or the neighboring cell, and help the terminal device save power.

Embodiments described in this specification may be independent solutions, or may be combined based on internal logic. These solutions all fall within the protection scope of this application. For example, in the solution shown in the method 800 or 900, after the timer expires, it may be determined, according to the solution shown in the method 1100 or 1200, whether to measure the serving cell and/or the neighboring cell.

It may be understood that, the methods and the operations implemented by the terminal device in the foregoing method embodiments may alternatively be implemented by a component (for example, a chip or a circuit) that may be used in the terminal device, and the methods and the operations implemented by the network device in the foregoing method embodiments may alternatively be implemented by a component (for example, a chip or a circuit) that may be used in the network device.

The foregoing describes the method embodiments provided in this application, and the following describes apparatus embodiments provided in this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in embodiments of this application from a perspective of interaction between network elements. It may be understood that, to implement the foregoing functions, each network element, such as a transmit-end device or a receive-end device, includes a corresponding hardware structure and/or software module for performing each function. A person skilled in the art may be aware that, with reference to the examples described in embodiments disclosed in this specification, units and algorithm steps may be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the protection scope of this application.

In embodiments of this application, function modules of the transmit-end device or the receive-end device may be divided based on the foregoing method examples. For example, each function module may be obtained through division based on a corresponding function, or two or more functions may be integrated into one processing module. The integrated module may be implemented in a form of hardware, or may be implemented in a form of a software function module. It should be noted that, in embodiments of this application, division into the modules is an example, and is merely logical function division. In actual implementation, another available division manner may be used. An example in which each function module is obtained through division based on a corresponding function is used below for description.

Figure 15:
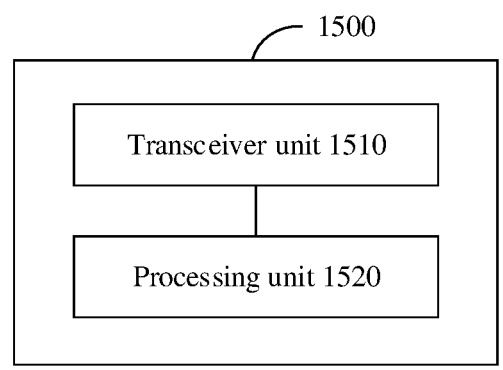
FIG. 15 is a schematic block diagram of a communications apparatus according to an embodiment of this application.

FIG. 15 is a schematic block diagram of a communications apparatus 1500 according to an embodiment of this application. The communications apparatus 1500 includes a transceiver unit 1510 and a processing unit 1520. The transceiver unit 1510 may communicate with the outside, and the processing unit 1520 is configured to process data. The transceiver unit 1510 may also be referred to as a communications interface or a communication unit.

Optionally, the communications apparatus 1500 may further include a storage unit. The storage unit may be configured to store instructions and/or data. The processing unit 1520 may read the instructions and/or data in the storage unit, to enable the communications apparatus to implement the foregoing method embodiments.

The communications apparatus 1500 may be configured to perform an action performed by the terminal device in the foregoing method embodiments. In this case, the communications apparatus 1500 may be the terminal device or a component that can be configured in the terminal device. The transceiver unit 1510 is configured to perform receiving and sending-related operations on the terminal device side in the foregoing method embodiments. The processing unit 1520 is configured to perform processing-related operations on the terminal device side in the foregoing method embodiments.

Alternatively, the communications apparatus 1500 may be configured to perform an action performed by the network device (for example, the serving cell) in the foregoing method embodiments. In this case, the communications apparatus 1500 may be the network device or a component that can be configured in the network device. The transceiver unit 1510 is configured to perform receiving and sending-related operations on the network device side in the foregoing method embodiments. The processing unit 1520 is configured to perform processing-related operations on the network device side in the foregoing method embodiments.

In a design, the communications apparatus 1500 is configured to perform an action performed by the terminal device in the embodiment shown in FIG. 8. The processing unit 1520 is configured to: measure a serving cell in a first time period, where the serving cell is a satellite cell; and determine not to measure the serving cell within a first duration when the serving cell meets a preset condition.

Optionally, that the serving cell meets a preset condition includes any one of the following: quality of the serving cell in the first time period is greater than or equal to a first threshold, or quality of the serving cell in the first time period is greater than or equal to quality of the serving cell in a second time period, or a difference between quality of the serving cell in a second time period and quality of the serving cell in the first time period is less than a second threshold, or the serving cell meets a cell selection criterion. The second time period is before the first time period, and the second threshold is greater than or equal to 0.

Optionally, the processing unit 1520 is configured to: when the serving cell meets the preset condition, start a timer by using the first duration as a duration, and skip measuring the serving cell during running of the timer.

Optionally, the first duration is determined based on a duration adjustment parameter, and the duration adjustment parameter is greater than 0.

Optionally, the transceiver unit 1510 is configured to receive indication information. The indication information is used to indicate at least one of the following: information about the first duration, information about the first threshold, and information about the second threshold.

In another design, the communications apparatus 1500 is configured to perform an action performed by the network device (for example, the serving cell) in the embodiment shown in FIG. 8. The processing unit 1520 is configured to generate indication information. The transceiver unit 1510 is configured to send the indication information. The indication information is used to indicate at least one of the following: information about a first duration, information about a first threshold, and information about a second threshold. The first duration is a duration within which the serving cell is not measured. The first threshold or the second threshold is used to determine whether the serving cell meets a first preset condition, and the second threshold is greater than or equal to 0. The serving cell is a satellite cell.

Optionally, the transceiver unit 1510 is configured to send a duration adjustment parameter and/or a threshold adjustment parameter, where the duration adjustment parameter is used to determine the first duration, and the threshold adjustment parameter is used to determine the second threshold.

In another design, the communications apparatus 1500 is configured to perform an action performed by the terminal device in the embodiment shown in FIG. 11. The transceiver unit 1510 is configured to receive transmission quality configuration information. The processing unit 1520 is configured to determine, based on the transmission quality configuration information and a transmission status of data, whether to measure a serving cell and/or a neighboring cell, where both the serving cell and the neighboring cell are satellite cells.

Optionally, the transmission quality configuration information includes a quantity N1 of retransmissions of the data, and N1 is an integer greater than 0. The processing unit 1520 is configured to measure the serving cell and/or the neighboring cell when the data is unsuccessfully received after N1 retransmissions.

Optionally, the transmission quality configuration information includes a quantity N2 and a quantity N3 of retransmissions of the data, and both N2 and N3 are integers greater than 0. The processing unit 1520 is configured to: measure the serving cell when the data is unsuccessfully received after N2 retransmissions, and measure the neighboring cell when the data is unsuccessfully received after N3 retransmissions.

Optionally, the transceiver unit 1510 is configured to send capability information of the terminal device.

In another design, the communications apparatus 1500 is configured to perform an action performed by the network device (for example, the serving cell) in the embodiment shown in FIG. 11. The processing unit 1520 is configured to generate transmission quality configuration information. The transceiver unit 1510 is configured to send the transmission quality configuration information, where the transmission quality configuration information is used by the terminal device to determine whether to measure a serving cell and/or a neighboring cell, and both the serving cell and the neighboring cell are satellite cells.

Optionally, the transmission quality configuration information includes a quantity N1 of retransmissions of data. The quantity N1 of retransmissions of the data is used by the terminal device to determine whether to measure the serving cell and/or the neighboring cell, and N1 is an integer greater than 0.

Optionally, the transmission quality configuration information includes a quantity N2 and a quantity N3 of retransmissions of data. The quantity N2 of retransmissions of the data is used by the terminal device to determine whether to measure the serving cell, the quantity N3 of retransmissions of the data is used by the terminal device to determine whether to measure the neighboring cell, and both N2 and N3 are integers greater than 0.

Optionally, the transceiver unit 1510 is configured to receive capability information of the terminal device.

In another design, the communications apparatus 1500 is configured to perform an action performed by the terminal device in the embodiment shown in FIG. 12. The transceiver unit 1510 is configured to obtain distance information. The processing unit 1520 is configured to determine, based on the distance information and a location of the terminal device, whether to measure a serving cell and/or a neighboring cell, where both the serving cell and the neighboring cell are satellite cells.

Optionally, the distance information includes information about a second parameter and a third parameter, and a value of the second parameter is greater than a value of the third parameter. The processing unit 1520 is configured to: skip measuring the serving cell and the neighboring cell when a distance between the terminal device and a center location of the serving cell is less than or equal to the second parameter; measure the serving cell and skip measuring the neighboring cell when the distance between the terminal device and the center location of the serving cell is greater than the second parameter and less than or equal to the third parameter; and measure the serving cell and the neighboring cell when the distance between the terminal device and the center location of the serving cell is greater than the third parameter.

Optionally, the transceiver unit 1510 is configured to send capability information of the terminal device.

In another design, the communications apparatus 1500 is configured to perform an action performed by the network device (for example, the serving cell) in the embodiment shown in FIG. 12. The processing unit 1520 is configured to generate distance information. The transceiver unit 1510 is configured to send the distance information, where the distance information is used by the terminal device to determine whether to measure a serving cell and/or a neighboring cell, and both the serving cell and the neighboring cell are satellite cells.

Optionally, the distance information includes information about a first parameter, and the first parameter is used by the terminal device to determine whether to measure the serving cell and/or the neighboring cell.

Optionally, the distance information includes information about a second parameter and a third parameter, a value of the second parameter is greater than a value of the third parameter, and the second parameter and/or the third parameter is used by the terminal device to determine whether to measure the serving cell and/or the neighboring cell.

Optionally, the transceiver unit 1510 is configured to receive capability information of the terminal device.

The processing unit 1520 in the foregoing embodiment may be implemented by using a processor or a processor-related circuit. The transceiver unit 1510 may be implemented by using a transceiver or a transceiver-related circuit. The transceiver unit 1510 may also be referred to as a communications unit or a communications interface. The storage unit may be implemented by using a memory.

Figure 16:
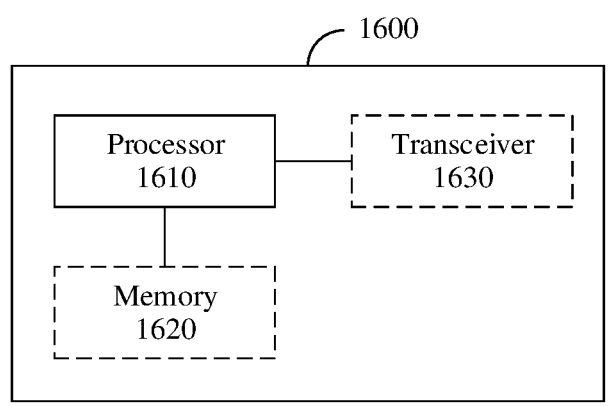
FIG. 16 is a schematic block diagram of another communications apparatus according to an embodiment of this application.

As shown in FIG. 16, an embodiment of this application further provides a communications apparatus 1600. The communications apparatus 1600 includes a processor 1610. The processor 1610 is coupled to a memory 1620. The memory 1620 is configured to store a computer program or instructions and/or data. The processor 1610 is configured to execute the computer program or instructions and/or data stored in the memory 1620, so that the methods in the foregoing method embodiments are executed.

Optionally, the communications apparatus 1600 includes one or more processors 1610.

Optionally, as shown in FIG. 16, the communications apparatus 1600 may further include a memory 1620.

Optionally, the communications apparatus 1600 may include one or more memories 1620.

Optionally, the memory 1620 may be integrated with the processor 1610, or separately disposed.

Optionally, as shown in FIG. 16, the communications apparatus 1600 may further include a transceiver 1630. The transceiver 1630 is configured to receive and/or send signals. For example, the processor 1610 is configured to control the transceiver 1630 to receive and/or send signals.

In a solution, the communications apparatus 1600 is configured to implement operations performed by the terminal device in the foregoing method embodiments.

For example, the processor 1610 is configured to implement processing-related operations performed by the terminal device in the foregoing method embodiments, and the transceiver 1630 is configured to implement receiving and sending-related operations performed by the terminal device in the foregoing method embodiments.

In another solution, the communications apparatus 1600 is configured to implement operations performed by the network device (the serving cell) in the foregoing method embodiments.

For example, the processor 1610 is configured to implement processing-related operations performed by the network device in the foregoing method embodiments, and the transceiver 1630 is configured to implement receiving and sending-related operations performed by the network device in the foregoing method embodiments.

An embodiment of this application further provides a communications apparatus 1700. The communications apparatus 1700 may be a terminal device or a chip. The communications apparatus 1700 may be configured to perform operations performed by the terminal device in the foregoing method embodiments.

Figure 17:
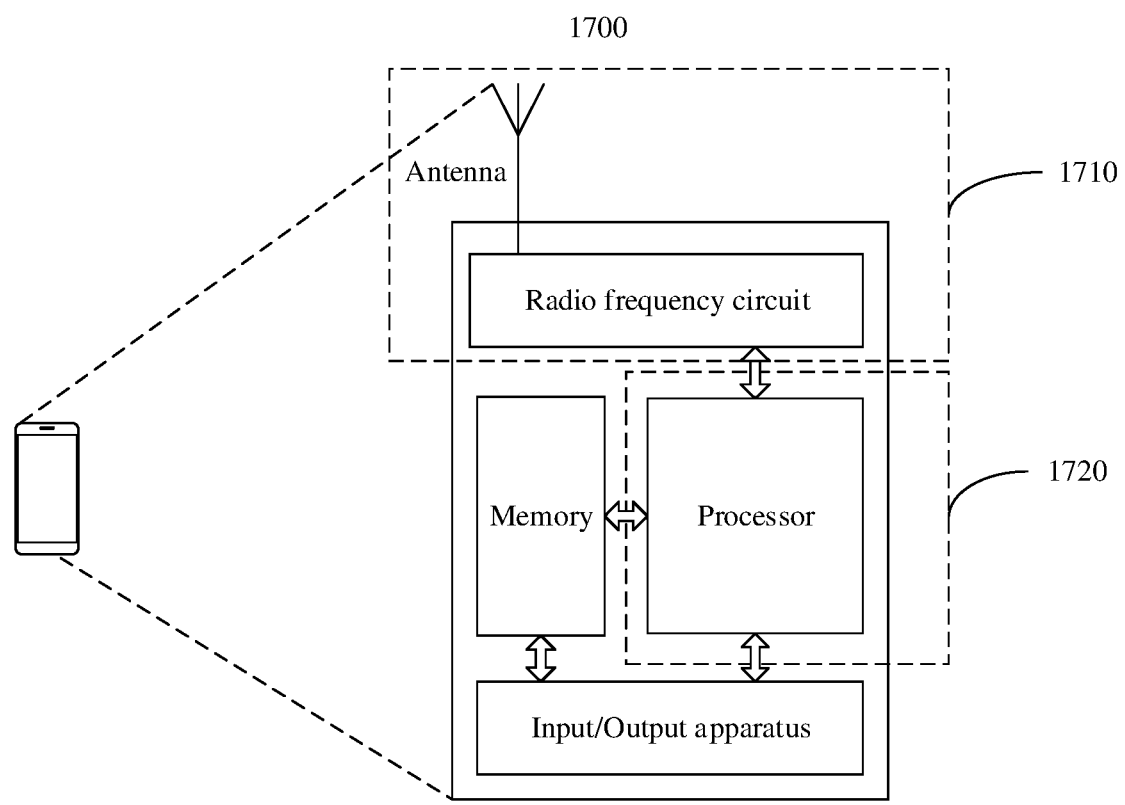
FIG. 17 is a schematic block diagram of a terminal device according to an embodiment of this application.

When the communications apparatus 1700 is a terminal device, FIG. 17 is a simplified schematic diagram of a structure of the terminal device. For ease of understanding and illustration, an example in which the terminal device is a mobile phone is used in FIG. 17. As shown in FIG. 17, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive radio frequency signals in a form of an electromagnetic wave. The input/output apparatus, for example, a touchscreen, a display, or a keyboard, is mainly configured to receive data input by a user and output data to the user. It should be noted that some types of terminal devices may have no input/output apparatus.

When data needs to be sent, the processor performs baseband processing on the to-be-sent data, and outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 17 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna that has sending and receiving functions and the radio frequency circuit may be considered as a transceiver unit of the terminal device, and the processor that has a processing function may be considered as a processing unit of the terminal device.

As shown in FIG. 17, the terminal device includes a transceiver unit 1710 and a processing unit 1720. The transceiver unit 1710 may also be referred to as a transceiver, a transceiver machine, a transceiver apparatus, or the like. The processing unit 1720 may also be referred to as a processor, a processing board, a processing module, a processing apparatus, or the like.

Optionally, a component that is in the transceiver unit 1710 and that is configured to implement a receiving function may be considered as a receiving unit, and a component that is in the transceiver unit 1710 and that is configured to implement a sending function may be considered as a sending unit. In other words, the transceiver unit 1710 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

For example, in an implementation, the processing unit 1720 is configured to perform processing actions on the terminal device side in FIG. 8, for example, measuring a serving cell in a first time period, where the serving cell is a satellite cell; determining whether the serving cell meets a preset condition; and skipping measuring the serving cell within a first duration when the serving cell meets the preset condition.

For another example, in an implementation, the processing unit 1720 is configured to perform steps 920, 930, and 940 in FIG. 9, and the transceiver unit 1710 is configured to perform the receiving operation in step 910 in FIG. 9.

For another example, in an implementation, the processing unit 1720 is configured to perform steps 1111 and 1112 in FIG. 11, and the transceiver unit 1710 is configured to perform the receiving operation in step 1110 in FIG. 11.

For another example, in an implementation, the processing unit 1720 is configured to perform steps 1211 and 1212 in FIG. 12, and the transceiver unit 1710 is configured to perform the receiving operation in step 1210 and the sending operation in step 1201 in FIG. 12.

It should be understood that FIG. 17 is merely an example instead of a limitation. The terminal device including the transceiver unit and the processing unit may not depend on the structure shown in FIG. 17.

When the communications apparatus 1700 is a chip, the chip includes a transceiver unit and a processing unit. The transceiver unit may be an input/output circuit or a communications interface. The processing unit may be a processor, a microprocessor, or an integrated circuit integrated on the chip.

An embodiment of this application further provides a communications apparatus 1800. The communications apparatus 1800 may be a network device or a chip. The communications apparatus 1800 may be configured to perform operations performed by the network device (the serving cell) in the foregoing method embodiments.

Figure 18:
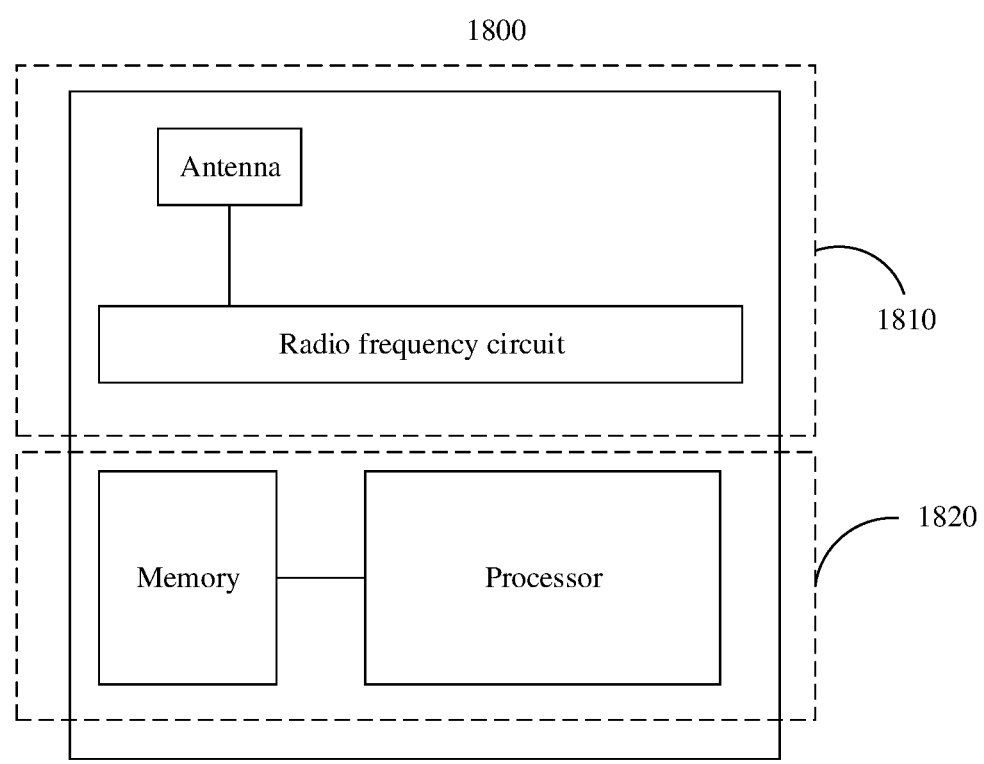
FIG. 18 is a schematic block diagram of a network device according to an embodiment of this application.

When the communications apparatus 1800 is a network device, for example, a base station, FIG. 18 is a simplified schematic diagram of a structure of the base station. The base station includes a part 1810 and a part 1820. The part 1810 is mainly configured to: send and receive a radio frequency signal, and perform conversion between the radio frequency signal and a baseband signal. The part 1820 is mainly configured to: perform baseband processing, control the base station, and the like. The part 1810 may usually be referred to as a transceiver unit, a transceiver machine, a transceiver circuit, a transceiver, or the like. The part 1820 is usually a control center of the base station, and may usually be referred to as a processing unit, and is configured to control the base station to perform processing operations on the network device side in the foregoing method embodiments.

The transceiver unit in the part 1810 may also be referred to as a transceiver machine, a transceiver, or the like. The transceiver unit includes an antenna and a radio frequency circuit. The radio frequency circuit is mainly configured to perform radio frequency processing. Optionally, a component that is in the part 1810 and that is configured to implement a receiving function may be considered as a receiving unit, and a component that is in the part 1810 and that is configured to implement a sending function may be considered as a sending unit. In other words, the part 1810 includes the receiving unit and the sending unit. The receiving unit may also be referred to as a receiver machine, a receiver, a receiver circuit, or the like. The sending unit may be referred to as a transmitter machine, a transmitter, a transmit circuit, or the like.

The part 1820 may include one or more boards, and each board may include one or more processors and one or more memories. The processor is configured to read and execute a program in the memory to implement a baseband processing function and control the base station. If there is a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the network device is a serving cell. The transceiver unit in the part 1810 is configured to perform receiving and sending-related steps performed by the serving cell in the embodiment shown in FIG. 8. The part 1820 is configured to perform processing-related steps performed by the serving cell in the embodiment shown in FIG. 8.

For example, in another implementation, the network device is a serving cell. The transceiver unit in the part 1810 is configured to perform the sending operation in step 910 in FIG. 9, and/or the transceiver unit in the part 1810 is further configured to perform other receiving and sending-related steps performed by the serving cell in the embodiment shown in FIG. 9. The part 1820 is configured to perform processing-related steps performed by the serving cell in the embodiment shown in FIG. 9.

For example, in another implementation, the network device is a serving cell. The transceiver unit in the part 1810 is configured to perform the sending operation in step 1110 in FIG. 11. The part 1820 is configured to perform processing-related steps performed by the serving cell in the embodiment shown in FIG. 11.

For example, in another implementation, the network device is a serving cell. The transceiver unit in the part 1810 is configured to perform the sending operation in step 1210 and the receiving operation in step 1201 in FIG. 12, and/or the transceiver unit in the part 1810 is further configured to perform other receiving and sending-related steps performed by the serving cell in the embodiment shown in FIG. 12. The part 1820 is configured to perform processing-related steps performed by the serving cell in the embodiment shown in FIG. 12.

It should be understood that FIG. 18 is merely an example instead of a limitation. The network device including the transceiver unit and the processing unit may not depend on the structure shown in FIG. 18.

When the communications apparatus 1800 is a chip, the chip includes a transceiver unit and a processing unit. The transceiver unit may be an input/output circuit or a communications interface. The processing unit is a processor, a microprocessor, or an integrated circuit integrated on the chip.

An embodiment of this application further provides a computer-readable storage medium. The computer-readable storage medium stores computer instructions used to implement the method performed by the terminal device or the method performed by the network device (for example, the serving cell) in the foregoing method embodiments.

For example, when the computer instructions are executed by a computer, the computer is enabled to implement the method performed by the terminal device or the method performed by the network device (for example, the serving cell) in the foregoing method embodiments.

An embodiment of this application further provides a computer program product including instructions. When the instructions are executed by a computer, the computer is enabled to implement the method performed by the terminal device or the method performed by the network device (for example, the serving cell) in the foregoing method embodiments.

An embodiment of this application further provides a communications system. The communications system includes the network device and the terminal device in the foregoing embodiments.

In an example, the communications system includes the network device and the terminal device in the embodiment described above with reference to FIG. 8.

In another example, the communications system includes the network device and the terminal device in the embodiment described above with reference to FIG. 9.

In another example, the communications system includes the network device and the terminal device in the embodiment described above with reference to FIG. 11.

In another example, the communications system includes the network device and the terminal device in the embodiment described above with reference to FIG. 12.

For explanations and beneficial effects of related content of any communications apparatus provided above, refer to the corresponding method embodiment provided above, and details are not described herein again.

In embodiments of this application, the terminal device or the network device may include a hardware layer, an operating system layer running on the hardware layer, and an application layer running on the operating system layer. The hardware layer may include hardware such as a central processing unit (CPU), a memory management unit (MMU), and a memory (which is also referred to as a main memory). The operating system of the operating system layer may be any one or more of computer operating systems implementing service processing by using a process, for example, a Linux operating system, a Unix operating system, an Android operating system, an iOS operating system, or a Windows operating system. The application layer may include applications such as a browser, an address book, word processing software, and instant communications software.

A specific structure of an execution body of the method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by a terminal device or a network device, or may be performed by a function module that is in a terminal device or a network device and that can invoke and execute a program.

Aspects or features of this application may be implemented as a method, an apparatus or a product that uses standard programming and/or engineering technologies. The term "product" used in this specification may cover a computer program that can be accessed from any computer-readable component, carrier or medium. For example, a computer-readable medium may include but is not limited to: a magnetic storage device (for example, a hard disk, a floppy disk or a magnetic tape), an optical disc (for example, a compact disc (CD) and a digital versatile disc (DVD)), a smart card, and a flash memory device (for example, an erasable programmable read-only memory (EPROM), a card, a stick, or a key drive).

Various storage media described in this specification may indicate one or more devices and/or other machine-readable media that are configured to store information. The term "machine-readable media" may include but is not limited to a radio channel, and various other media that can store, contain, and/or carry instructions and/or data.

It should be understood that, the processor mentioned in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM). For example, the RAM may be used as an external cache. As an example instead of a limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA, or another programmable logic device, a discrete gate or a transistor logic device, or a discrete hardware component, the memory (storage module) may be integrated into the processor.

It should be further noted that the memory described in this specification is intended to include, but is not limited to, these memories and any other memory of a suitable type.

A person of ordinary skill in the art may be aware that, in combination with the examples described in embodiments disclosed in this specification, units and steps may be implemented by electronic hardware or a combination of computer software and electronic hardware. Whether the functions are performed by hardware or software depends on particular application and a design constraint of the technical solutions. A person skilled in the art may use different methods to implement the described functions for each particular application, but it should not be considered that the implementation goes beyond the protection scope of this application.

It may be clearly understood by a person skilled in the art that, for convenient and brief description, for a detailed working process of the foregoing apparatus and units, refer to a corresponding process in the foregoing method embodiments, and details are not described herein again.

In the several embodiments provided in this application, it should be understood that the disclosed apparatus and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of the embodiments.

In addition, functional units in embodiments of this application may be integrated into one unit, or each of the units may exist alone physically, or two or more units are integrated into one unit.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. For example, the usable medium may include but is not limited to any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a terminal device, comprising:
   measuring a serving cell in a first time period, wherein the serving cell is a satellite cell; and
   skipping measuring the serving cell within a first duration, when the serving cell meets a preset condition based on measurement of the serving cell in the first time period, wherein:
   the first duration is determined based on a duration adjustment parameter,
   the duration adjustment parameter is greater than 0,
   a quantity of the duration adjustment parameter is determined, when the terminal device determines that the serving cell meets the preset condition, based on a difference between a quality of the serving cell in two measurements, and
   the quantity of the duration adjustment parameter is used to adjust a duration configured by a network device by adding the quantity of the duration adjustment parameter to the duration configured by the network device, to determine the first duration.

2. The method according to claim 1, wherein that the serving cell meets the preset condition comprises at least one of following:
   the quality of the serving cell in the first time period is greater than or equal to a first threshold;
   the quality of the serving cell in the first time period is greater than or equal to a quality of the serving cell in a second time period;
   a difference between the quality of the serving cell in the second time period and the quality of the serving cell in the first time period is less than a second threshold; or
   the serving cell meets a cell selection criterion, and
   wherein the second time period is before the first time period, and the second threshold is greater than or equal to 0.

3. The method according to a claim 2, wherein the method further comprises:
   receiving indication information, wherein the indication information indicates at least one of following: information about the first duration, information about the first threshold, or information about the second threshold.

4. The method according to claim 2, wherein that the serving cell meets the preset condition comprises that the quality of the serving cell in the first time period is better than the quality of the serving cell in the second time period.

5. The method according to claim 4, where the first time period and the second time period are two adjacent measurement periods.

6. The method according to claim 2, wherein that the serving cell meets the preset condition comprises that the difference between the quality of the serving cell in the second time period and the quality of the serving cell in the first time period is less than the second threshold, the second threshold is determined based on a pre-configured quality threshold and a threshold adjustment parameter, and the threshold adjustment parameter is greater than 0.

7. The method according to claim 1, wherein the method further comprises:
   when the serving cell meets the preset condition, starting, by the terminal device, a timer by using the first duration as a duration of the timer; and wherein skipping measuring the serving cell within the first duration comprises:
skipping measuring the serving cell during running of the timer.

8. The method according to claim 1, further comprising:
re-measuring, by the terminal device, the serving cell; and
skipping, by the terminal device, measuring the serving cell within a second duration, wherein the second duration is determined based on the duration adjustment parameter and the first duration.

9. A method applied to a network device, comprising:
generating indication information; and
sending the indication information, wherein the indication information indicates: information about a first duration, and further indicates information about a first threshold, or information about a second threshold, wherein:
the first threshold or the second threshold is used to determine whether a serving cell meets a first preset condition, the second threshold is greater than or equal to 0, the serving cell is a satellite cell, the indication information enables a terminal device to determine whether to skip measuring the serving cell within the first duration based on whether the first preset condition is met, the information about the first duration comprises a duration adjustment parameter, the duration adjustment parameter is greater than 0, a quantity of the duration adjustment parameter is determined, when the terminal device determines that the serving cell meets first preset condition, based on a difference between a quality of the serving cell in two measurements, and the quantity of the duration adjustment parameter is used to adjust a duration configured by the network device by adding the quantity of the duration adjustment parameter to the duration configured by the network device, to determine the first duration.

10. The method according to claim 9, wherein the method further comprises:
sending a threshold adjustment parameter, wherein the threshold adjustment parameter is used to determine the second threshold.

11. A communications apparatus, comprising at least one processor, wherein the at least one processor is coupled to a non-transitory memory storing a computer program or instructions, and the at least one processor is configured to execute the computer program or the instructions in the memory, to cause the apparatus to:
measure a serving cell in a first time period, wherein the serving cell is a satellite cell; and
skip measuring the serving cell within a first duration, when the serving cell meets a preset condition based on measurement of the serving cell in the first time period, wherein:
the first duration is determined based on a duration adjustment parameter,
the duration adjustment parameter is greater than 0,
a quantity of the duration adjustment parameter is determined, when the apparatus determines that the serving cell meets the preset condition, based on a difference between a quality of the serving cell in two measurements, and
the quantity of the duration adjustment parameter is used to adjust a duration configured by a network device by adding the quantity of the duration adjustment parameter to the duration configured by the network device, to determine the first duration.

12. The apparatus according to claim 11, wherein that the serving cell meets the preset condition comprises at least one of following:
the quality of the serving cell in the first time period is greater than or equal to a first threshold;
the quality of the serving cell in the first time period is greater than or equal to a quality of the serving cell in a second time period;
a difference between the quality of the serving cell in the second time period and the quality of the serving cell in the first time period is less than a second threshold; or
the serving cell meets a cell selection criterion, wherein the second time period is before the first time period, and the second threshold is greater than or equal to 0.

13. The apparatus according to claim 12, wherein the apparatus is further caused to:
receive indication information, wherein the indication information indicates at least one of following: information about the first duration, information about the first threshold, or information about the second threshold.

14. The apparatus according to claim 12, wherein that the serving cell meets the preset condition comprises that the quality of the serving cell in the first time period is better than the quality of the serving cell in the second time period.

15. The apparatus according to claim 14, where the first time period and the second time period are two adjacent measurement periods.

16. The apparatus according to claim 12, wherein that the serving cell meets the preset condition comprises that the difference between the quality of the serving cell in the second time period and the quality of the serving cell in the first time period is less than the second threshold, the second threshold is determined based on a pre-configured quality threshold and a threshold adjustment parameter, and the threshold adjustment parameter is greater than 0.

17. The apparatus according to claim 11, wherein the apparatus is further caused to:
when the serving cell meets the preset condition, starting a timer by using the first duration as a duration of the timer; and
skip measuring the serving cell during running of the timer.

18. The apparatus according to claim 11, wherein the at least one processor is configured to execute the computer program or the instructions in the memory, to further cause the apparatus to:
re-measure the serving cell; and
skip measuring the serving cell within a second duration, wherein the second duration is determined based on the duration adjustment parameter and the first duration.

* * * * *